US010569340B2

(12) United States Patent
Gehlsen

(10) Patent No.: US 10,569,340 B2
(45) Date of Patent: Feb. 25, 2020

(54) FLOATING AND PRECISION ADJUSTABLE CUTTERS FOR BORING

(71) Applicant: The Boeing Company, Chicago, IL (US)

(72) Inventor: Paul Gehlsen, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/997,500

(22) Filed: Jun. 4, 2018

(65) Prior Publication Data

US 2018/0281080 A1 Oct. 4, 2018

Related U.S. Application Data

(62) Division of application No. 14/798,418, filed on Jul. 13, 2015, now Pat. No. 9,987,688.

(51) Int. Cl.
| | |
|---|---|
| *B23B 29/034* | (2006.01) |
| *B23B 41/12* | (2006.01) |
| *B23B 27/16* | (2006.01) |

(52) U.S. Cl.
CPC ...... *B23B 29/03417* (2013.01); *B23B 29/034* (2013.01); *B23B 41/12* (2013.01);
(Continued)

(58) Field of Classification Search
CPC ............... B23B 29/03; B23B 29/03417; Y10T 408/858; Y10T 408/8588; Y10T 408/855; Y10T 408/85895
See application file for complete search history.

(56) References Cited

U.S. PATENT DOCUMENTS

| 931,883 A | 8/1909 | Muth et al. |
|---|---|---|
| 1,671,307 A | 5/1928 | Morgan |

(Continued)

FOREIGN PATENT DOCUMENTS

| DE | 661415 C | * 6/1938 | ........... B32B 29/034 |
|---|---|---|---|
| DE | 2140004 A1 | 2/1973 | |
| DE | 3936243 A1 | 5/1991 | |

OTHER PUBLICATIONS

Jones et al., Production Engineering: Jig and Tool Design, 1972, retrieved from the internet on May 8, 2015 from URL: https://books.google.com/books?id=Sq4gBQAAQBAJ&pg=PA117&dq=Production+Engineering:+Jig+and+ToolDesign&hl=en&sa=X&ei=FNeSVZzjO4meoQTiv6_AAg&ved=0CDEQ6AEwAA#v=onepage&q=Production%20Engineering%3A%20Jig%20and%20Tool%20Design&f=false, 5 pages.

(Continued)

*Primary Examiner* — Eric A. Gates
*Assistant Examiner* — Chwen-Wei Su
(74) *Attorney, Agent, or Firm* — Kolisch Hartwell, P.C.

(57) ABSTRACT

A cutter assembly for a boring bar may include a cutter body, a cutter-element carrier, and an adjustment assembly having an adjustment element. The cutter-element carrier may be configured to be slidingly received in a channel in the cutter-body. The cutter-element carrier may have a first surface transverse to the first line. The adjustment element may have a second surface defining a position of the cutter-element carrier in the channel when the second surface is in contact with the first surface. The adjustment element may be movable along a second line transverse to the first surface for adjusting the position of the cutter-element carrier in the channel. The cutter body may include first and second recess portions. First and second insert portions may be inserted into the first and second recess
(Continued)

portions, respectively, and may define float travel-limits for the cutter body.

20 Claims, 12 Drawing Sheets

(52) U.S. Cl.
CPC ....... *B23B 27/1681* (2013.01); *B23B 27/1685* (2013.01); *Y10T 408/858955* (2015.01); *Y10T 408/885* (2015.01)

(56) References Cited

U.S. PATENT DOCUMENTS

| | | | |
|---|---|---|---|
| 1,746,381 A | | 2/1930 | Davis |
| 1,769,230 A | * | 7/1930 | Manning ............. B23B 29/0341 244/35 R |
| 1,949,872 A | * | 3/1934 | Miller ................. B23B 29/0341 408/162 |
| 2,076,663 A | | 4/1937 | Miller |
| 2,201,495 A | * | 5/1940 | Miller .................... B23B 29/03 408/153 |
| 2,349,189 A | | 5/1944 | Murray |
| 2,359,474 A | * | 10/1944 | Gairing ................. B23B 51/107 279/79 |
| 3,755,868 A | | 9/1973 | LaForge et al. |
| 3,794,437 A | | 2/1974 | Mazoguchi |
| 5,054,970 A | | 10/1991 | Steiner |
| 5,209,610 A | | 5/1993 | Arai et al. |
| 5,863,156 A | | 1/1999 | Satran et al. |
| 7,077,608 B2 | | 7/2006 | Hartman |
| 2010/0247256 A1 | * | 9/2010 | Katzenberger .......... B23B 29/02 408/1 BD |

OTHER PUBLICATIONS

Madison Cutting Tools, Inc. Double Edged Boring and Reaming Tools, retrieved from the internet on May 8, 2015 from URL: http://madisontools.com/doubleedgedboringandreamingtools/, 2 pages.

Muskegon Tool, Double-Edge Boring, retrieved from the internet on May 8, 2015 from URL: http://www.muskegontool.com/doubleedgeboring.html, 4 pages.

U.S. Patent and Trademark Office, Non-Final Office Action regarding U.S. Appl. No. 14/798,418, dated May 12, 2017, 15 pages.

U.S. Patent and Trademark Office, Final Office Action regarding U.S. Appl. No. 14/798,418, dated Oct. 11, 2017, 14 pages.

* cited by examiner

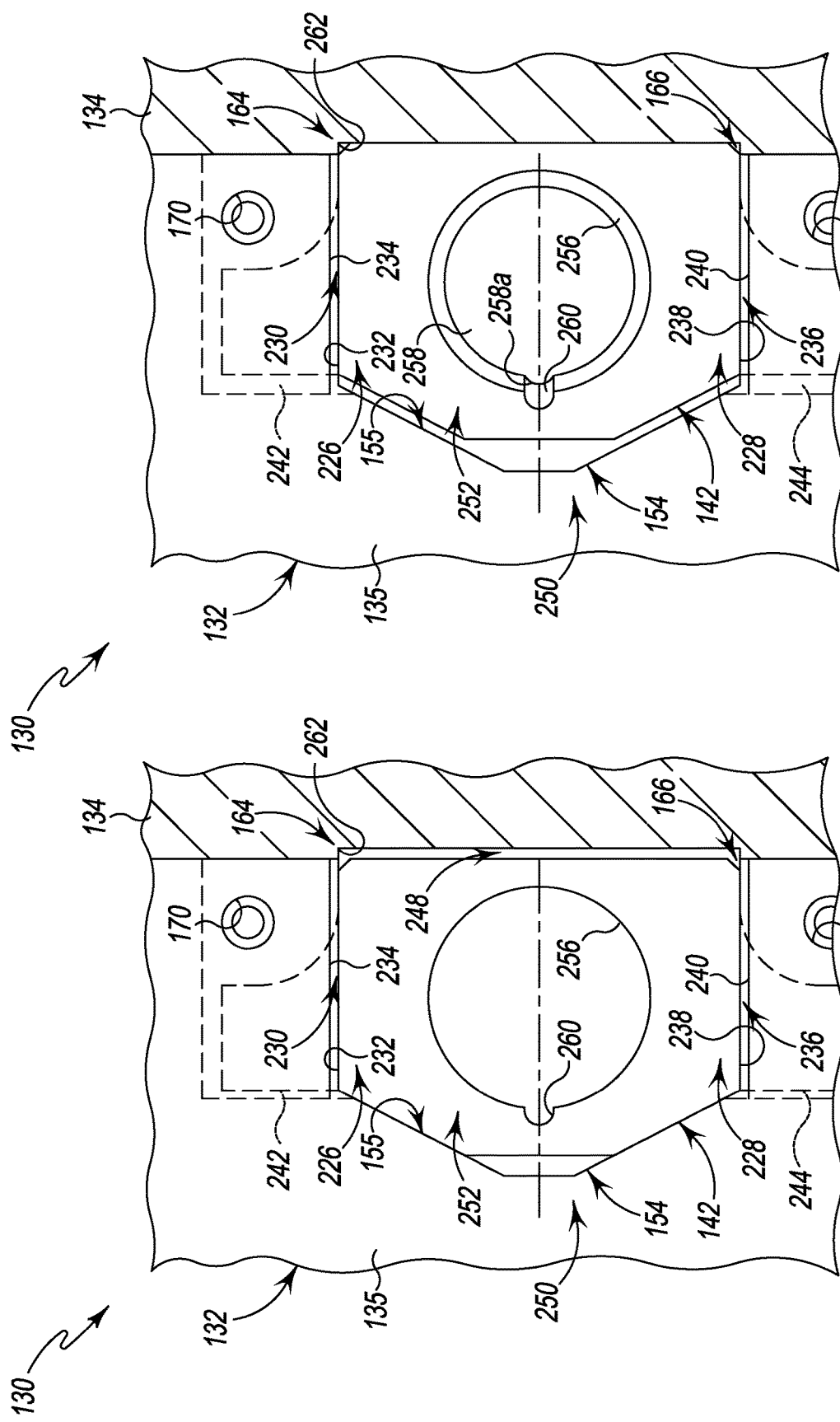

FLOATING AND PRECISION ADJUSTABLE CUTTERS FOR BORING

CROSS-REFERENCE

This application is a divisional application of U.S. patent application Ser. No. 14/798,418, filed Jul. 13, 2015. The complete disclosure of the above-identified patent application is hereby incorporated by reference for all purposes.

FIELD

This disclosure relates to line boring. More specifically, the disclosed embodiments relate to apparatus and methods for floating cutters and precisely positioning cutter tools for boring or reaming.

INTRODUCTION

A floating cutter, sometimes called a floating reamer, has been used within the metal working industry for over 100 years. Used with a line boring bar and supported by two or more bearing journals, this type of cutter is often employed to machine very precise bores in engine crank cases or any product where several bores must be machined in line using a common boring tool. When line boring a part, the initial rough holes are established by other means, such as drilling, coring or casting. The boring bar is then inserted though the rough holes and attached to a drive spindle that rotates and feeds the bar axially into the material. Due to the long length of parts or cut, the boring bar is often supported by additional outboard bearings or journals. Extremely rigid machine spindle connections may not require an outboard support provided the boring bar does not overhand to a point where runout becomes undesirable. The cutters are then installed in a slot(s) in the boring bar and the machining operation takes place.

When line boring, several factors are in play that can cause inaccuracies in the bore size, bore location and finish. The boring bar is not perfectly straight and a runout between supports of only 0.0004 inches is doubled as the boring bar rotates through a full turn. The cutting point relative to the boring bar centerline cannot be perfectly established nor can the boring bar centerline relation to the support bearing's centerline be perfectly controlled. There are clearances between the bar and support bearings that allow the bar to slide accurately, and these can further add to the error.

Many tool grind shops grind the cutter point while the cutter is locked in the bar. While this eliminates some of the inaccuracies, it is inefficient in a production environment. ISO standard indexable cutting inserts are intended to eliminate the need for tool sharpening as the user can just swap a dull cutting insert for a new, sharp one. Even though these cutting inserts are manufactured to a very tight inscribed circle tolerance, this tolerance or error exists in the final tool set up as the cutting insert is rotated to a new cutting edge.

To eliminate the errors caused by boring bar runout and the fact that the cutter can never be perfectly set to the bars theoretical centerline, the floating cutter was introduced. The basic concept is the cutter itself will actually float radially in the boring bar so that bar runout, set up errors and bearing inaccuracies do not translate into the actual cut. To work properly, a previous roughing or semi-finish cut is taken to establish the bore centerline using standard cutters fixed radially and axially in the bar. Final diameter is not critical. The cutting points on the floating cutter have a small radial range of float of 0.015 to 0.030 inches.

This float allows the cutter to follow the existing bore by balancing the oppositional cutting forces common to a dual-point cutter. This has been proven in industry, but has a significant drawback. The cutter is subject to proper installation and adjustment by the mechanic. In a production environment, this can cause out-of tolerance holes if a lapse in procedure occurs. Commercially available floating cutters require the user to install the cutter, tighten a lock screw to a specified torque, then back it off a quarter of a turn to loosen, or allow the cutter to float. These cutters are not easily adjusted for diametrical size every time the cutting insert is changed, thus errors in size can occur, but often may fall within an allowable tolerance range. With care, these cutters can yield tolerances of approx 0.001 inches on the diameter. With standard practice, tolerances of 0.002 to 0.003 inches can be expected.

A single point cutter with an indexable cutting insert may also be used. Prior to each job, the cutter and boring bar are sent to a tool grind shop to be indexed and set to final size. This is time consuming, involves in-plant transportation, and is subject to errors. Even though the single point cutter is more accurate than a twin in a non-floating application, bar runout, bearing errors, etc all come into play. The cutter may be installed into a boring bar using a tapered screw in a tapered bore passing through the cutter. This screw allows a repeatable and accurate means to lock the cutter in place when a mechanic torques the screw to a specific value. The same torque is preferably used by the tool grind shop to set up the cutter. Accuracy generally is 0.001 to 0.002 inches on the diameter. Many of the machining operations require greater accuracy and a secondary finish operation, such as honing, may be required to reach final size.

SUMMARY

The present disclosure provides apparatus and methods for line boring or reaming bores in work pieces, and more specifically to apparatus and methods for floating cutters and apparatus and methods for precisely positioning cutter tools for boring or reaming.

In some embodiments, a cutter assembly may include a cutter body, a cutter-element carrier and an adjustment element. The cutter body may be configured to be mounted in a cutter slot of a boring bar and may have an axis of rotation corresponding to an axis of rotation of the boring bar. The cutter body may include a channel extending along a first line transverse to the axis of rotation. The channel may have an open end disposed distally of the axis of rotation and a length extending away from the open end. The cutter-element carrier may be configured to support a cutter element at a cutter-element station. The cutter-element carrier may be slidingly received in the cutter-body channel and configured to be movable in the channel along the first line with the cutter-element station disposed to support the cutter element in a position beyond the channel open end. The cutter-element carrier may have a first surface transverse to the first line. The adjustment element may have a second surface defining a position of the cutter-element carrier in the channel when the second surface is in contact with the first surface. The adjustment element may be movable along a second line transverse to the first surface for adjusting the position of the cutter-element carrier in the channel. The second surface may be at less than a 45-degree angle to the first surface.

In some embodiments, a cutter assembly may include a cutter body, a cutter-element carrier, an adjustment wedge, and an adjustment screw. The cutter body may be configured to be mounted in a cutter slot of a boring bar and may having an axis of rotation corresponding to an axis of rotation of the boring bar. The cutter body may include a channel extending along a first line normal to the axis of rotation. The channel may have an open end disposed distally of the axis of rotation and a floor defining a planar first surface opposite the open end. The cutter body may include a threaded adjustment bore aligned with the adjustment wedge. The cutter-element carrier may be configured to support a cutter element at a cutter-element station. The cutter-element carrier may be slidingly received in the cutter-body channel and configured to be movable in the channel along the first line with the cutter-element station disposed to support the cutter element in a position beyond the channel open end. The cutter-element carrier may have a planar second surface transverse to the first line. The adjustment wedge may be disposed in the channel between the first and second surfaces and aligned with the adjustment bore. The adjustment wedge may have a planar third surface parallel to and in flush contact with the second surface and a planar fourth surface parallel to and in flush contact with the first surface. The adjustment wedge may be movable along a second line transverse to the third surface and parallel to the fourth surface for adjusting the position of the cutter-element carrier in the channel. The third surface may be at less than a 45-degree angle to the axis of rotation. The adjustment screw may have TPI threads per inch received in the adjustment bore. The threaded bore and adjustment screw may be configured to move the adjustment wedge by rotation of the adjustment screw in the adjustment bore with the adjustment screw in contact with the wedge. One complete rotation of the adjustment screw moving the cutter-element carrier an adjustment amount $$A = \frac{\frac{1}{TPI}\tan b}{\cos a}$$

where a is an angle of the third surface to the axis of rotation, and b is an angle of the second surface to the third surface. The sum a+b may be less than 45 degrees.

In some embodiments, a method may include supporting a cutter-element carrier in a channel of a cutter body, the channel extending in a channel line transverse to an axis of rotation of the cutter body during boring. The method may include moving a first surface of an adjustment element a first distance in a first direction transverse to the channel line and transverse to a second surface of the cutter-element carrier directly facing the first surface, where one of the first and second surfaces extend continuously in an interface line disposed transverse to the first direction and transverse to the channel line. The method may include, during or after moving the first surface of the adjustment element, moving the cutter-element carrier a second distance in the channel along the channel line so that the first surface is in contact with the second surface.

In some embodiments, a cutter assembly may include a cutter body configured to be mounted in a cutter slot of a boring bar and may have an axis of rotation corresponding to an axis of rotation of the boring bar. The cutter slot may extend along a slot line transverse to the axis of rotation. The cutter body, when mounted in the cutter slot, may be movable in the cutter slot along the slot line. The cutter body may include at least a first recess portion defining a first cutter surface facing a first direction along the cutter line and a second recess portion defining a second cutter surface facing a second direction opposite to the first direction along the cutter line. The first and second recess portions each may have a respective opening portion facing transverse to the cutter line. The cutter assembly may include first and second insert portions configured to be inserted through the respective openings into the first and second recess portions, respectively. The first insert portion may define a first travel-limit surface that faces the first cutter surface and the second insert portion may define a second travel-limit surface that faces the second cutter surface.

In some embodiments, a method may include inserting a cutter body into a cutter slot of a boring bar. The cutter slot may extend along a slot line transverse to the axis of rotation. The cutter body, when mounted in the cutter slot, may be movable in the cutter slot along the slot line. The method may include inserting a first insert portion into a first recess portion of the cutter body. The first recess portion may define a first cutter surface facing a first direction along the cutter line. The first insert portion may define a first travel-limit surface that faces the first cutter surface. The method may include inserting a second insert portion into a second recess portion of the cutter body. The second recess portion may define a second cutter surface facing a second direction opposite to the first direction along the cutter line. The first and second recess portions each may have a respective opening portion facing transverse to the cutter line. The second insert portion may define a second travel-limit surface that faces the second cutter surface. The method may include securing the first and second insert portions to the boring bar. The method may include boring a bore in a workpiece with the cutter body floating between the first and second travel-limit surfaces.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 10 is an enlargement of a portion of the boring assembly shown in FIG. 3 illustrating a position of the float-limiting insert in a cutter body during placement of the cutter assembly in a cutter slot of the boring bar.

FIG. 11 is an enlargement of the portion of the boring assembly shown in FIG. 10 illustrating securing the float-limiting insert to the boring bar to allow the cutter assembly to float during boring.

DESCRIPTION

Overview

Illustrative embodiments of boring assemblies and cutter assemblies are described below and illustrated in the associated drawings. Unless otherwise specified, a boring assembly, a cutter assembly, and/or various components of such assemblies may, but are not required to, contain at least one of the structure, components, functionality, and/or variations described, illustrated, and/or incorporated herein. The following descriptions of the embodiments are merely exemplary in nature and are in no way intended to limit the disclosure, their application, or their uses. Additionally, the advantages provided by the embodiments, as described below, are illustrative in nature and not all embodiments provide the same advantages or the same degree of advantages.

Disclosed apparatus and methods may address adjustment and use of cutter assemblies in boring. Disclosed embodiments may include a leveraged adjustment mechanism that may allow fine adjustment in the position of a cutter element. Disclosed embodiments may provide precise alignment of a cutter assembly during set-up. In some embodiments, an objectively determined range of floating for a dual-point cutter assembly may be provided.

Examples, Components, and Alternatives

Figure 1:
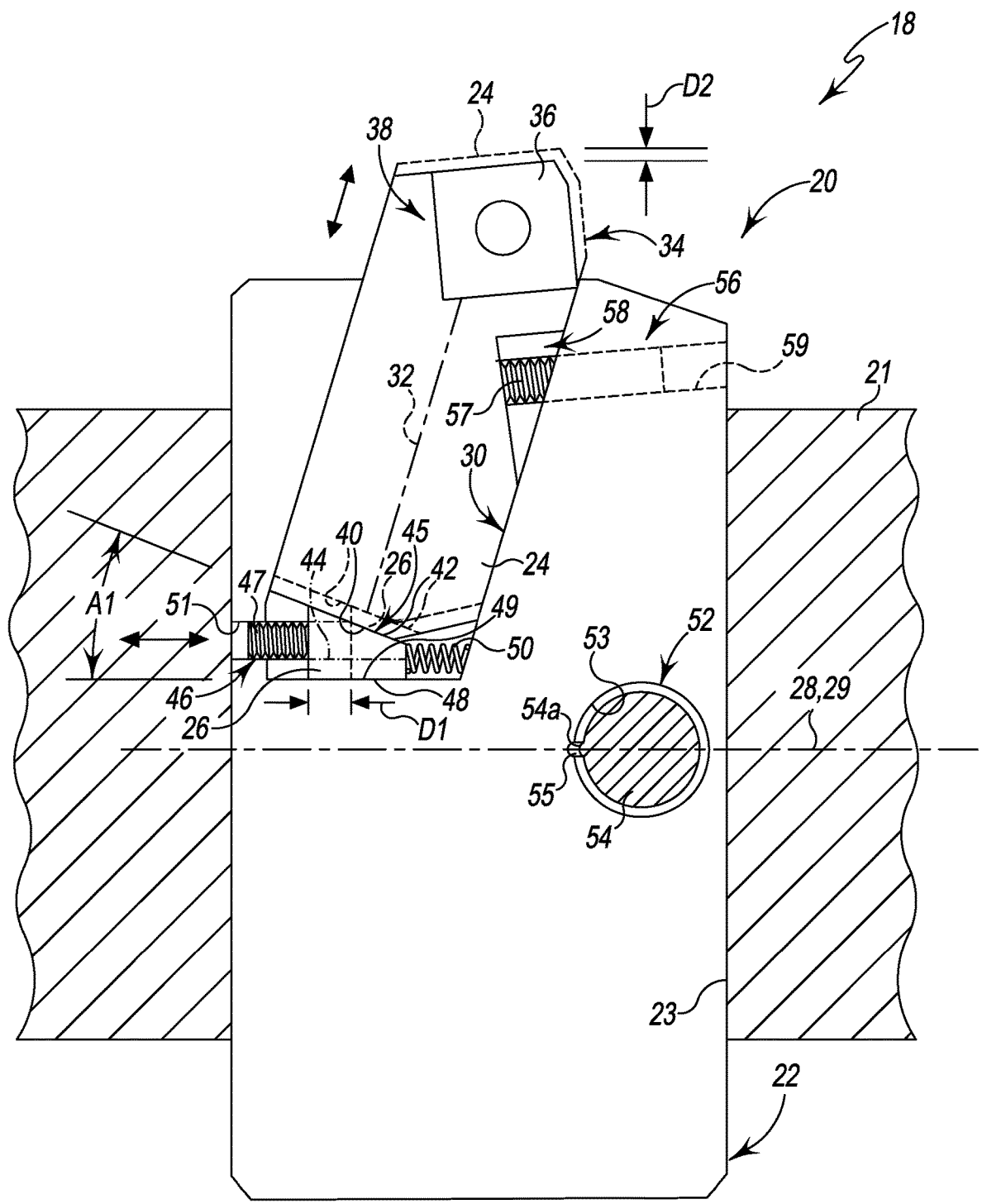
FIG. 1 is a schematic side view of an example of an adjustable cutter assembly.
Figure 2:
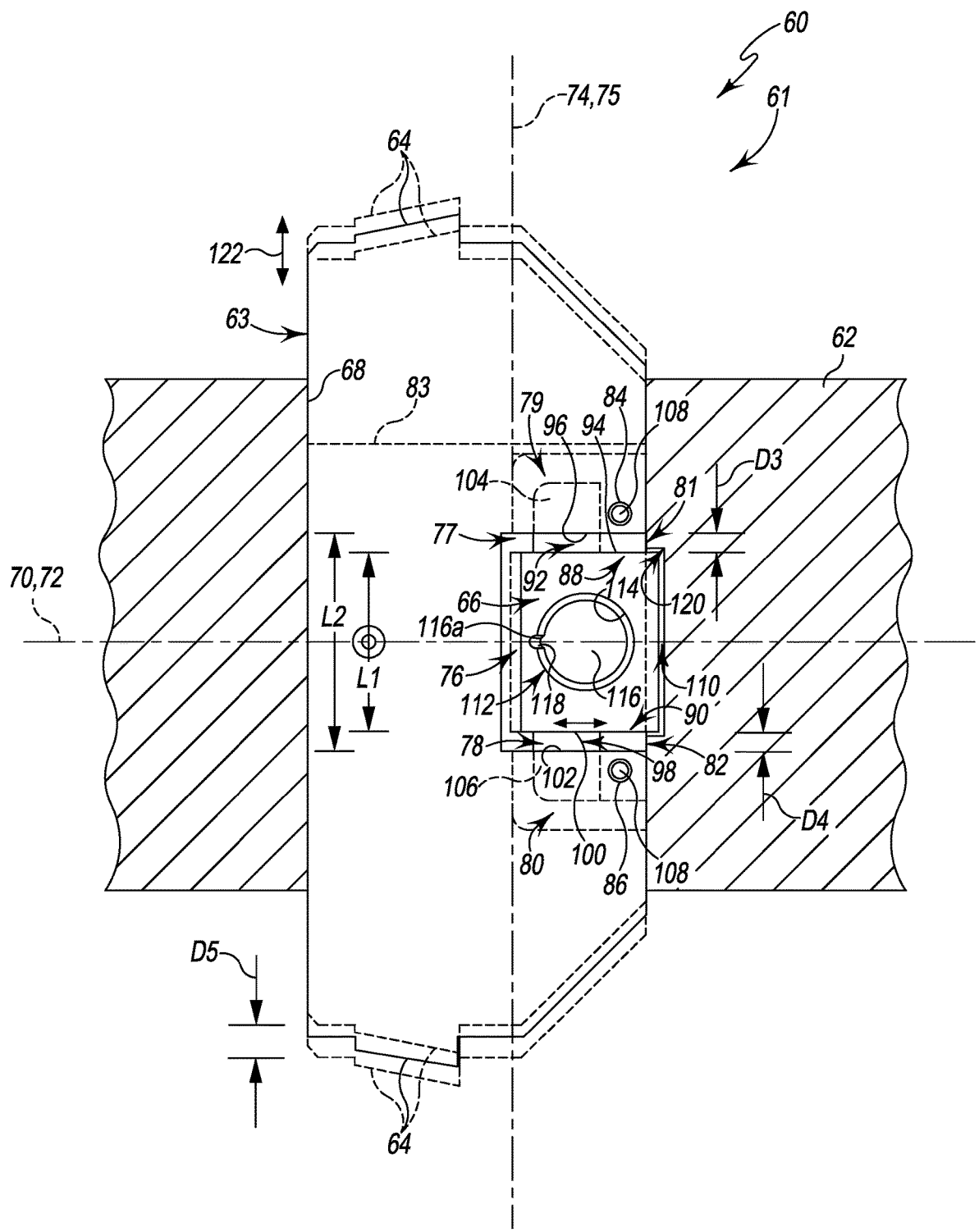
FIG. 2 is a schematic side view of an example of a floating cutter assembly.

The following examples describe selected aspects of exemplary embodiments of boring assemblies and cutter assemblies, as well as related apparatus and methods. These examples are intended for illustration and should not be interpreted as limiting the scope of the present disclosure. Each example may include one or more distinct inventions, and/or contextual or related information, function, and/or structure. More specifically, FIGS. 1 and 2 depict basic embodiments of adjustable and floating cutter assemblies and associated boring assemblies. FIGS. 3-14 depict various features of a further embodiment of a boring assembly and cutter assembly having adjustable and floating dual cutting elements.

Example 1

FIG. 1 is a schematic view of an example of a boring assembly 18 including an adjustable cutter assembly 20 and a boring bar 21 supporting the cutter assembly in a cutter slot 23. Adjustable cutter assembly 20 includes a cutter body 22, a cutting-element carrier 24, and an adjustment element 26. The cutter body 22 may be configured to be mounted in cutter slot 23 of boring bar 21 and has an axis of rotation 28 corresponding to an axis of rotation 29 of the boring bar 21. The cutter body 22 may include a channel 30 extending along a first line 32 transverse to the axis of rotation 28. The line 32 of the channel 30 may be perpendicular to the axis of rotation 28, or may vary from perpendicular, such as being angled toward a direction of axial travel of the cutter assembly 20 during boring as is shown in FIG. 1. The channel 30 may have an open end 34 disposed distally of the axis of rotation 28 and a length extending away from the open end 34.

The cutting-element carrier 24 may be configured to support a cutting element 36 at a cutting-element station 38. The cutting-element carrier 24 may be slidingly received in the cutter-body channel 30 to accommodate replacement and to allow for adjustment of the position of the cutting-element station 38, and thereby the distance of the cutting element 36 from the axis of rotation 28. The cutting-element carrier 24 may be configured to be movable in the channel 30 along the first line 32 with the cutting-element station 38 disposed to support the cutting element 36 in a position beyond the channel open end 34. The cutting-element carrier 24 may have a first surface 40 transverse to the first line 32. In this example, the surface 40 is also transverse to the axis of rotation 28. The surface 40 forms part of an end of the cutting-element carrier 24 proximal to the axis of rotation 28. In other examples, the surface 40 may extend into a side of the cutting-element carrier 24 intermediate the ends of the cutting-element carrier 24.

The adjustment element 26, having the shape of a wedge, may have a second surface 42 defining a position of the cutting-element carrier 24 in the channel 30 when the second surface 42 is in contact with the first surface 40. The adjustment element 26 may be movable along a second line 44 transverse to the first surface 40 for adjusting the position of the cutting-element carrier 24 in the channel 30. The second surface 42 may be at less than a 45-degree angle to the cutter line 32. One of the first surface 40 and second surface 42 extends continuously along an interface path 45 disposed transverse to the channel line 32. Interface path 45 represents an area of contact between the first surface 40 and the second surface 42 during relative movement of the cutting-element carrier 24 and the adjustment element 26, so the shape of the interface path 45 depends on the configuration of surfaces 40 and 42. The adjustment element 26 may include a third surface 48, and the cutter body 22 may include a fourth surface 49 in contact with the third surface 48. In this example, the fourth surface 49 is what may be considered a floor of channel 30. The third surface 48 moves along the fourth surface 49 when the adjustment element 26 is moved along the second line 44. The shape of second line 44 is determined by the configuration of the third surface 48 and the fourth surface 49.

In this example, the first and second surfaces 40, 42 are continuous planar surfaces that are in contact with each other. Similarly, the third and fourth surfaces are continuous planar surfaces that are in contact with each other. These surfaces may have other configurations. For example the surfaces may be curved and the shape of the surfaces in each pair of surfaces may be different. As a further example, one of the pair of surfaces may be a convex surface or knob that contacts the other of the pair of surfaces. At least one of each pair of surfaces is preferably a continuous surface where the pair of surfaces are in contact. In this example, second line 44 and surfaces 48 and 49 are parallel to the axis of rotation 28. As will be seen in the embodiment of FIG. 3, second line 44 may be transverse to the axis of rotation 28.

The cutter assembly 20 may also include a drive element 46 supported by the cutter body 22 and configured to be manipulatable by a person for moving the adjustment element 26 along the second line 44. The drive element 46 may comprise an adjustment screw 47 aligned with the adjustment element 26. The cutter body 22 may include a threaded adjustment bore 51 in which the adjustment screw 47 is threadedly received. In some examples, the drive element may also be the adjustment element, such as where the adjustment screw directly contacts first surface 40 of cutting-element carrier 24. In such an example, the surface of the adjustment screw 47 is the second surface.

The cutter assembly 20 may include a resilient bias element, such as a return spring 50 disposed proximate surface 49 of channel 30 and spaced from cutting-element carrier 24. Return spring 50 may be in compression between a side of channel 30 and an end face of the adjustment element 26. In this example, the return spring 50 is configured to maintain the wedge 26 against the adjustment screw 47.

As is explained in further detail with reference to FIG. 7, the adjustment screw 47 and adjustment bore 51 have TPI threads per inch. The adjustment screw 47 may be configured to move the adjustment element 26 by rotation of the adjustment screw 47 in the adjustment bore 51 with the adjustment screw 47 in contact with the adjustment element 26. N complete rotations of the adjustment screw 47 moves the adjustment element 26 a distance D1 equal to N/TPI. This in turn moves the cutting-element carrier 24 an adjustment amount $$D2 = \frac{\frac{N}{TPI} \tan b}{\cos a}$$

where a is an angle of the second line 44 to the axis of rotation 28, which in this example also corresponds to the angle of the third and fourth surfaces 48 and 49 to the axis of rotation 28, and b is an angle of the first and second surfaces 40 and 42 to the second line 44 and the third and fourth surfaces 48 and 49. In this example, the angle a is equal to 0-degrees, and the angle b is equal to angle A1, which preferably is less than 45-degrees. The adjustment screw 48, when rotated, moves the adjustment element 26 a first distance D1 in a first direction along the second line 44, which in this example is transverse to the channel line 32 and is also transverse to the first surface 40 of the cutting-element carrier 24 directly facing the second surface 42.

Movement of the adjustment element 26 by a distance D1, produces a corresponding movement of the cutting-element carrier 24 a distance D2 in a radial direction from the axis of rotation 28. It will be seen that the cutting-element carrier 24 may be moved during or after moving the first surface 40 of the adjustment element 26. In the example shown, movement of the adjustment element 26 further into channel 30 forces the cutting-element carrier 24 away from the axis of rotation 28, increasing the radius of a bore that is bored by the boring assembly 18.

When the adjustment screw 47 is rotated in a reverse direction, the adjustment element 26 follows the movement of the adjustment screw 47 by action of the return spring 50 acting on the adjustment element 26. The cutting-element carrier 24 is then moved in the channel 30 until the first surface 40 is in contact with the second surface 42.

The cutter assembly 20 may include a securing assembly 52, configured to fix the adjustable cutter assembly 20 to the boring bar 21. The securing assembly may include a tapered bore 53 and a tapered screw 54. In the embodiment shown in FIG. 1, the tapered screw assembly is located along the axis of rotation 28 of the cutter body 22, spaced from channel 30. A notch 55 is formed in tapered bore 53 appropriately configured to force the tapered screw 54 to index on two edges of the tapered bore 53 and secure the cutter assembly 20 to the boring bar 21 and aligning the cutter assembly 20 with the axis of rotation 29 of the boring bar 21.

The cutter assembly 20 may further include a lock assembly 56 configured to secure the cutting-element carrier 24 to the cutter body in the channel 30 after adjusting the position of the cutting-element carrier by manipulation of the adjustment element 26. The lock assembly 56 may include a threaded lock screw 57, a notch 58, and a threaded bore 59. Notch 58 is formed in a side of the cutting-element carrier 24 and includes a face angled toward the floor of channel 30. This secures the cutting-element carrier 24 against the second surface 42 of the adjustment element 26. The threaded bore 59 extends through a side of the cutter body 22. In this example, the threaded bore 59 extends in a line slightly angled toward the axis of rotation 28 from the outer end of the bore.

Example 2

FIG. 2 is a schematic side view of an example of a floating cutter assembly 60. The floating cutter assembly 60 may be part of a boring assembly 61 that also includes a boring bar 62. Cutter assembly 60 includes a cutter body 63, dual cutting points or cutting elements 64, and a float-limiting insert 66. Some dimensions of the boring assembly 61 shown in FIG. 1 are exaggerated for clarity.

The cutter body 63 may be configured to be mounted in a cutter slot 68 of the boring bar 62. The cutter body 63 may have an axis of rotation 70 corresponding to an axis of rotation 72 of the boring bar 62. The cutter slot 68 may extend along a slot line 74 transverse to the axis of rotation 70. The cutter body 63, when mounted in the cutter slot 68, may be movable in the cutter slot 68 along the slot line 74.

The cutter body 63 may extend between the cutting elements 64 along a cutter line 75 corresponding to slot line 74. The cutter body 63 may include a recess 76, including a first recess portion 77 and a second recess portion 78, extending into one side of the cutter body 63. In this example, the recess 76 is configured to be symmetrical about the axis of rotation 70. A first slit 79 extends radially from the first recess portion 77 and a second slit 80 extends radially from the second recess portion 78 opposite from the first recess portion 77. The first and second slits 79 and 80 open axially along the axial side of the cutter body 63 forming extensions of the first and second recess portions 77 and 78. The first and second recess portions 77, 78 may have respective opening portions 81 and 82 facing axially away from the cutter body 63. The first and second recess portions 77, 78 may also be separate recesses in cutter body 63, and they may be positioned on axially opposite sides of the cutter body 63.

The cutter body 63 may have a maximum cross-section configuration, such as along a plane represented by a transverse line 83 that is orthogonal to the cutter line 75 and, in this example, parallel to the axis of rotation 70 of the cutter body 63. This maximum cross-section configuration allows the cutter assembly 60 to be slidingly received in the boring-bar cutter slot 68.

A threaded first retention bore 84 extends through at least a portion of the cutter body 63 in a position aligned with slit 79, and a threaded second retention bore 86 extends through at least a portion of the cutter body in a position aligned with slit 80.

The float-limiting insert 66 is configured to be fully received in recess 76, and may include a first insert portion 88 disposed in first recess portion 77 and a second insert portion 90 disposed in second recess portion 78. In some examples, the first and second insert portions 88, 90 may be on separate float-limiting inserts, and they may be positioned at other locations on the cutter body 63, such as on the same side of the axis of rotation 70 or at axially opposite sides of the cutter body 63.

The insert 66 disposed in the recess 76 has a length L1 that is less than a length L2 of the recess 76, as viewed in the plane of FIG. 2 corresponding to a plane parallel to a side face of the cutter body 63. As a result, with the float-limiting insert 66 positioned in an intermediate position in the recess 76, there is a first radial gap 92, having a width D3, between a first insert surface 94 of the insert 66 and a facing first cutter-body surface 96. Similarly, there is a second radial gap 98, having a width D4, between a second insert surface 100 of the insert 66 and a facing second cutter-body surface 102.

The float-limiting insert 66 is sized to be fully received in the recess 76, as is indicated by the position of the float-limiting insert 66 shown in dashed lines. When fully received in the recess 76, the float-limiting insert 66 and associated portion of cutter body 63 define a cross-sectional configuration that is within the maximum cross-section configuration of the cutter body 63, thereby allowing the cutter assembly 60 to be inserted into the cutter slot 68 with the float-limiting insert 66 positioned in the recess 76.

The float-limiting insert 66 includes a first retention tab 104 extending radially from the first insert portion 88 into slit 79. Similarly, a second retention tab 106 extends radially from the second insert portion 90 into slit 80. The first and second retention tabs 104 and 106 are configured to allow retention screws 108 to be inserted into first and second retention bores 84 and 86. The retention screws 108 allow the float-limiting insert 66 to move freely within the recess 76 along the cutter line 75 between first and second cutter-body surfaces 96 and 102. The retention screws 108 are also positioned to allow the float-limiting insert 66 to move freely along the axis of rotation 70 between the position in which the insert 66 is fully received in the recess 76 and the position shown in solid lines in which the insert 66 extends partially beyond the edge of the cutter body 63 and into a pocket 110 formed in the boring bar 62.

The cutter assembly 60 includes a securing assembly 112 for securing the float-limiting insert 66 to the boring bar 62. The securing assembly 112 may include a tapered bore 114 and a fastener in the form of a tapered screw 116. In the embodiment shown in FIG. 2, the securing assembly 112 is located along the axis of rotation 70 of the cutter body 63. A notch 118 is formed in tapered bore 114 appropriately configured to force the tapered screw 116 to index on two edges of the tapered bore 114 and secure the float-limiting insert 66 into a corner 120 of the pocket 110, thereby securing the float-limiting insert 66 to the boring bar 21 and aligning the float-limiting insert with the axis of rotation 70.

With the float-limiting insert 66 secured to the boring bar 62, the cutter body 63 is allowed to float along slot line 74 within the limits defined by the first insert surface 94 and the second insert surface 100. The cutter body 63 can float a total distance equal to the sum of the distances D3 and D4 of the first and second radial gaps 92 and 98. Cutting elements 64 thus float, as represented by double-ended arrow 122, a total distance D5 equal to the sum of distances D3 and D4.

Example 3

Figure 3:
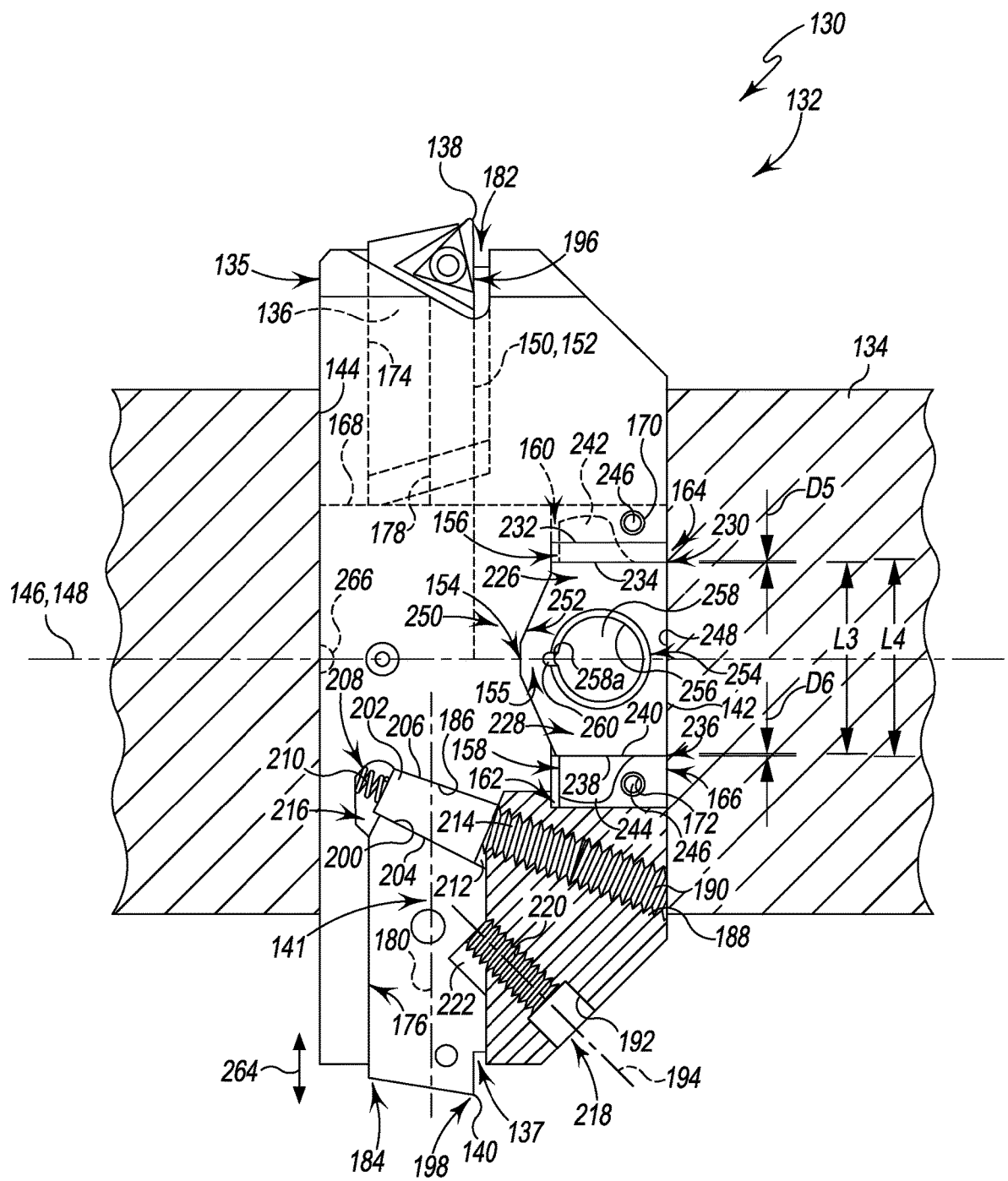
FIG. 3 is a schematic cross-sectional view of an example of a portion of a boring bar assembly showing a side view of an adjustable cutter assembly.
Figure 4:
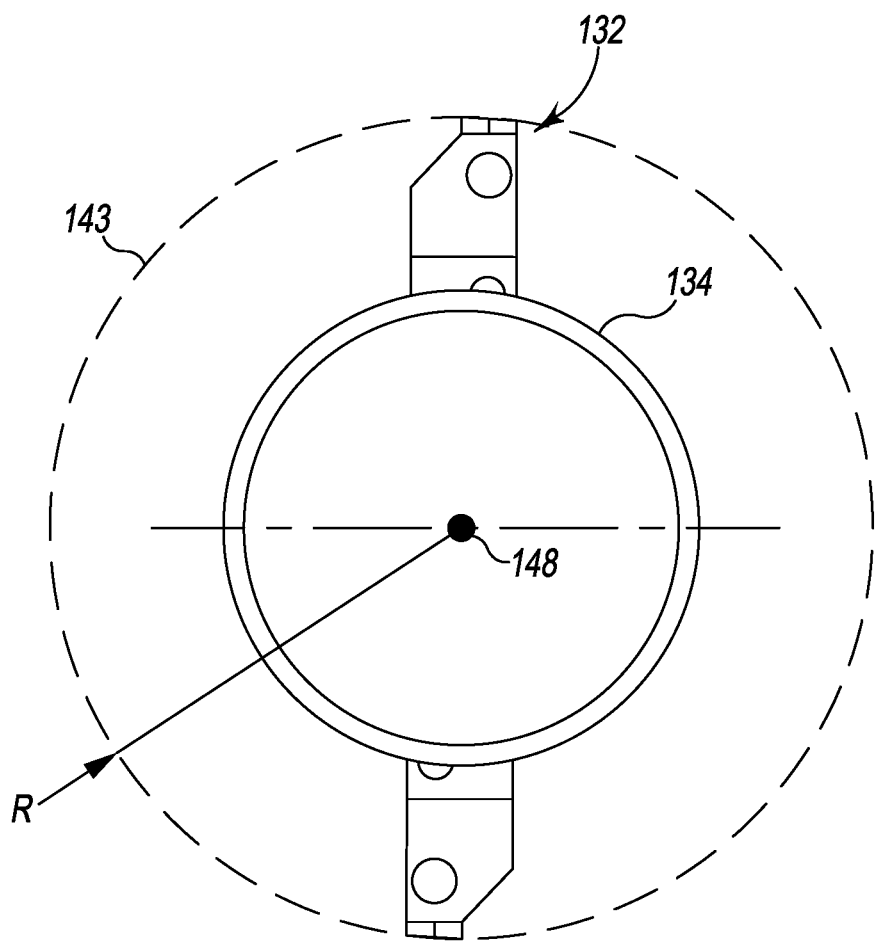
FIG. 4 is a schematic end view of an example of a production boring bar assembly including the cutter assembly of FIG. 3 illustrating a bore produced during boring.
Figure 5:
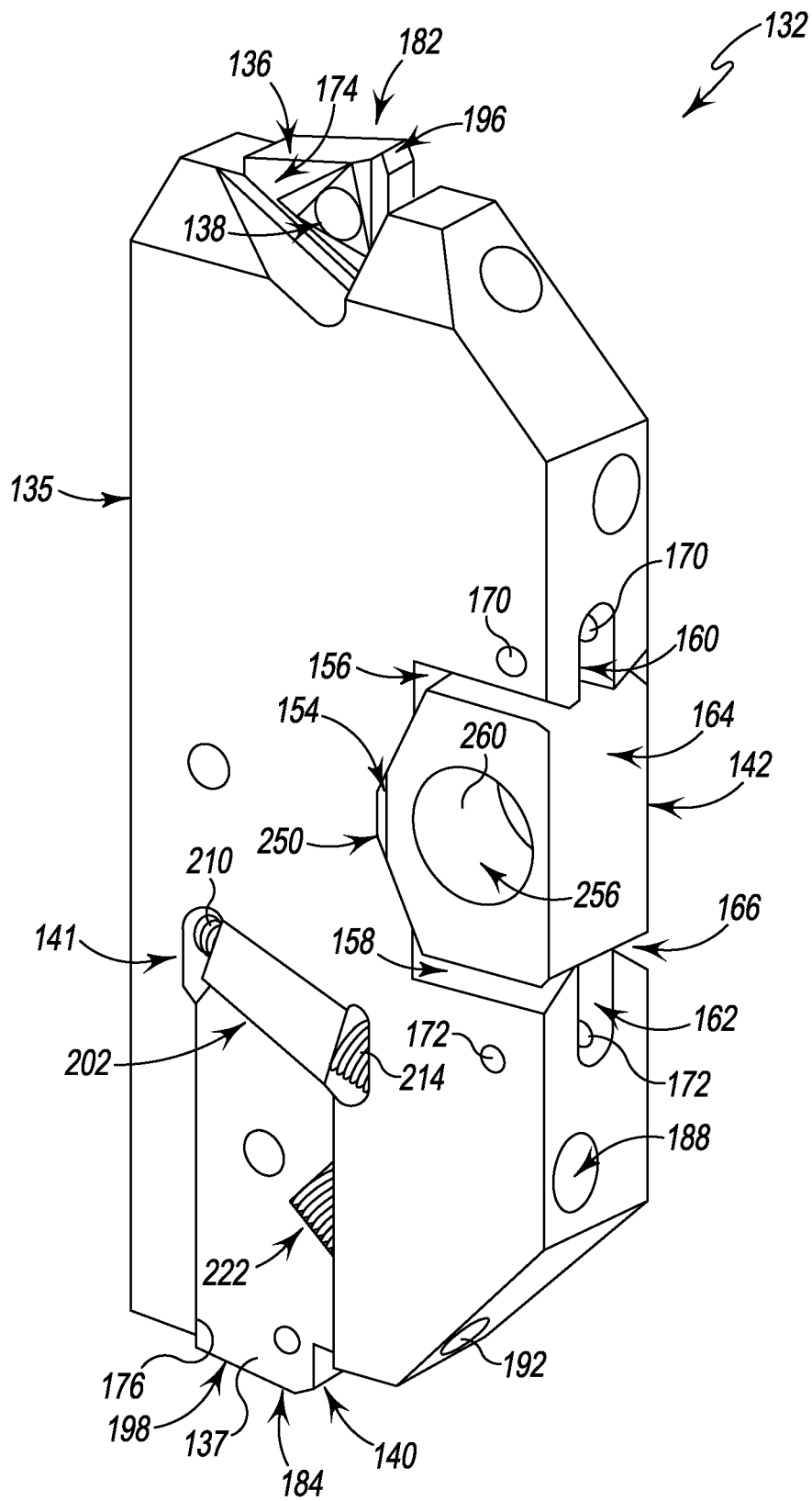
FIG. 5 is a schematic isometric view of the cutter assembly shown in FIG. 3.
Figure 6:
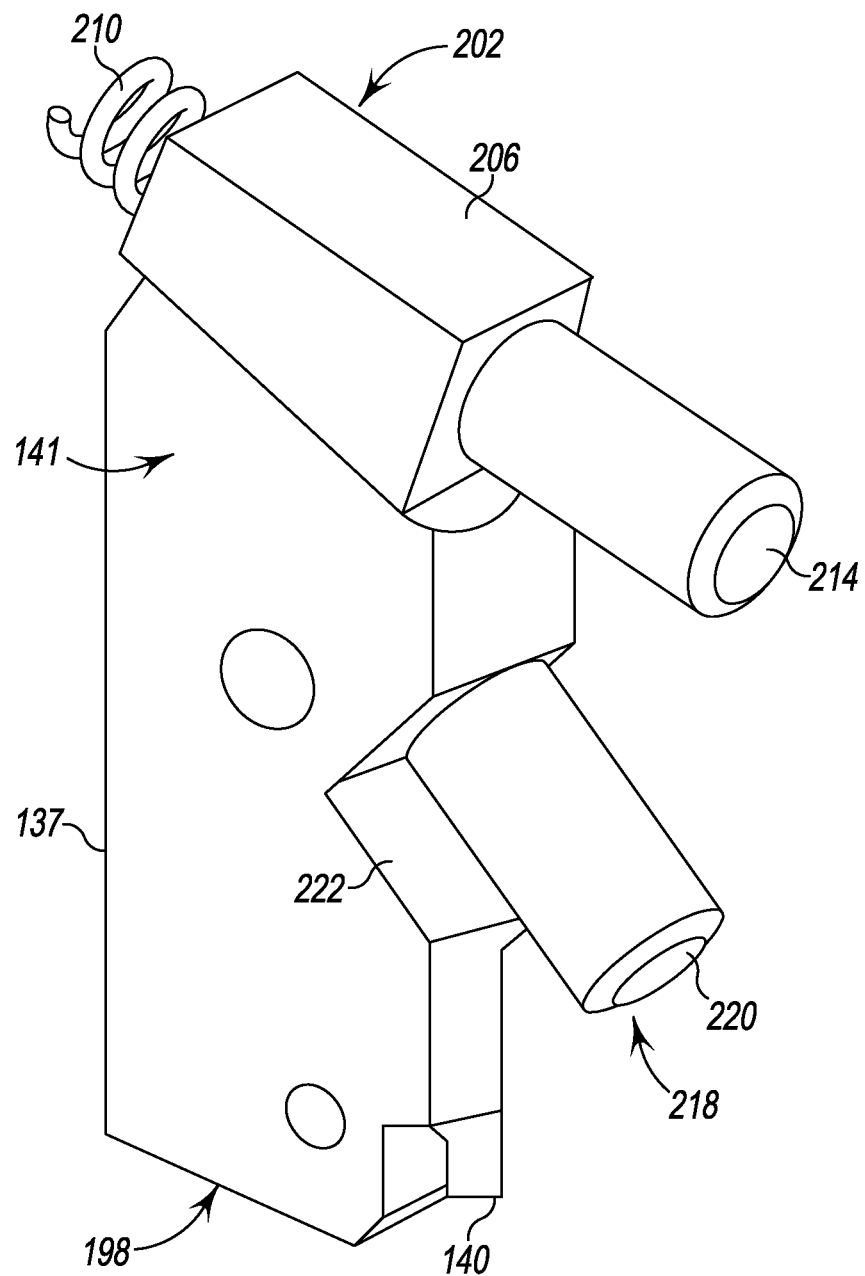
FIG. 6 is a schematic isometric view a tool holder and adjustment wedge included in the cutter assembly shown in FIG. 3.
Figure 8:
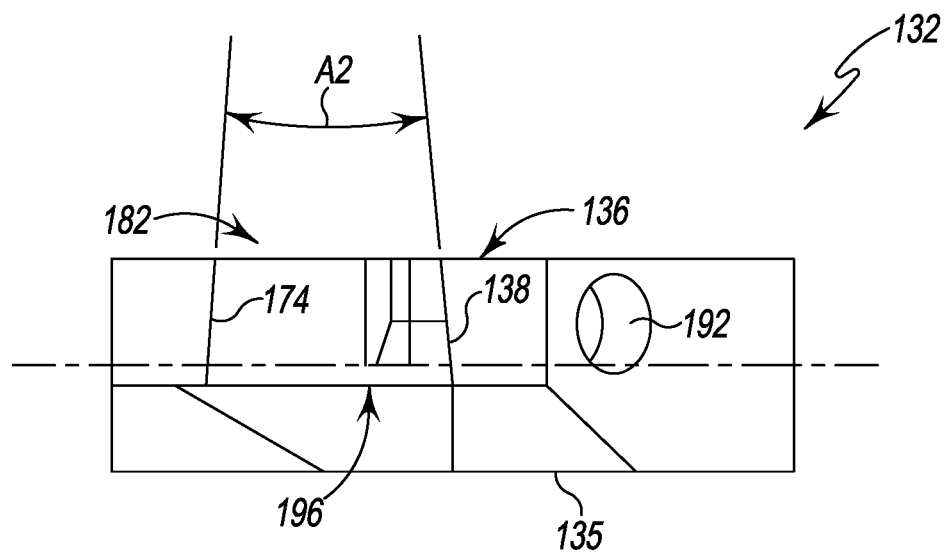
FIG. 8 is a schematic end view of the cutter assembly shown in FIG. 3.

FIG. 3 is a schematic cross-sectional view of an example of a portion of a boring assembly 130 showing a side view of an adjustable cutter assembly 132. The boring bar assembly 130 may include the adjustable cutter assembly 132 and a boring bar 134. The cutter assembly 132 includes a cutter body 135, cutting-element carriers 136, 137, cutting elements 138, 140, adjustment assemblies, such as an adjustment assembly 141 associated with cutting-element carrier 137, and a float-limiting insert 142. FIG. 4 illustrates a view of the boring assembly 130 taken from an end of the boring bar 134. The boring assembly is configured to produce a production bore 143 in a work piece. The production bore is represented with a dash-dot line and has a radius, R, equal to half a diameter D, or D/2. An isometric view of the cutter assembly 132 is shown in FIG. 5, and a view of an end of the cutter assembly 132, corresponding to a top view, from the perspective of FIG. 3, is shown in FIG. 8.

The cutter body 135 may be configured to be mounted in a cutter slot 144 of the boring bar 134. The cutter body 135 may have an axis of rotation 146 corresponding to an axis of rotation 148 of the boring bar 134. The cutter slot 144 may extend along a slot line 150 transverse to the axis of rotation 148. The cutter body 135, when mounted in the cutter slot 144, may be movable in the cutter slot 144 along the slot line 150. In this example, cutter assembly 132 is symmetrical about the axis of rotation 146.

The cutter body 135 may extend between the cutting elements 138 and 140, along a cutter line 152 corresponding to slot line 150. The cutter body 135 may include a recess 154, including a first recess portion 156 and a second recess portion 158, extending into one side of the cutter body 135. In this example and as described further with reference to FIGS. 10 and 11, the recess 154 includes a V-shaped alignment element 155 and is configured to be used to align the cutter body 135 with the axis of rotation 146. In this example, the alignment element is symmetrical about the axis of rotation 146.

A first slit 160 extends radially from the first recess portion 156 and a second slit 162 extends radially from the second recess portion 158 opposite from the first recess portion 156. The first and second slits 160 and 162 open axially along the axial side of the cutter body 135, as shown in FIG. 5, and form extensions of the first and second recess portions 156 and 158. The first and second recess portions 156, 158 may have respective opening portions 164 and 166 facing axially away from the cutter body 135. The first and second recess portions 156, 158 may also be separate recesses in cutter body 135, and they may be positioned on axially opposite sides of the cutter body 135.

The cutter body 135 may have a maximum cross-section configuration, such as along a plane represented by a transverse line 168 that is orthogonal to the cutter line 152 and, in this example, parallel to the axis of rotation 146 of the cutter body 135. The maximum cross-section configuration is also shown in the end view of the cutter assembly 132 illustrated in FIG. 8. This maximum cross-section configuration allows the cutter assembly 132 to be slidingly received in the boring-bar cutter slot 144.

A threaded first retention bore 170 extends through at least a portion of the cutter body 135 in a position aligned with slit 160, and a threaded second retention bore 172, shown also in FIG. 5, extends through at least a portion of the cutter body 135 in a position aligned with slit 162.

The cutter body 135 may include channels 174 and 176 extending respectively along channel lines 178 and 180 transverse to the axis of rotation 146. Channels 174, 176 are configured to receive cutting-element carriers 136, 137, respectively. Line 178 of the channel 174 and line 180 of the channel 176 may be perpendicular to the axis of rotation 146, as shown in FIG. 3, or may vary from perpendicular, such as being angled toward a direction of axial travel of the cutter assembly 132 during boring.

Channels 174 and 176 may have respectively open ends 182 and 184 disposed distally of the axis of rotation 146 and a length extending away from the open ends 182 and 184. As shown by the end view of cutter assembly 132 in FIG. 8, the sides of channels 174, 176 are slanted inwardly at a non-zero angle, such as at an acute angle A2, in a dovetail configuration. As a result, the inside of the channel is wider than the opening face along channel lines 178, 180. The channels 174, 176 each have a floor surface, such as floor surface 186 of channel 176 shown in FIG. 3.

The cutter body 135 further includes a threaded adjustment bore associated with each channel 174, 176, such as a threaded adjustment bore 188 extending along an adjustment line 190 from a side of the cutter body 135 to adjacent the floor surface 186 of the channel 176. Additionally, the cutter body 135 includes a threaded lock bore 192 extending along a lock line 194 from the same side of the cutter body 135 as the adjustment bore 188 from a position between the cutter station 198 and the adjustment bore 188 to an intermediate portion of the channel 176.

As particularly shown in FIG. 8, the cutting-element carriers 136, 137 have sides also angled at the acute angle A4 conforming to the angled sides of channels 174, 176, similar to angled tenon and mortise of a dovetail joint. As a result, the exposed faces of the cutting-element carriers 136, 137 are more narrow than the faces of the cutting-element carriers 136, 137 in contact with the cutter body 135. The respective angled sides permit the cutting-element carriers 136, 137 to move in the channels 174, 176 along channel lines 178, 180, but prevent lateral movement of the cutting-element carriers 136, 137 out of the channels 174, 176.

The cutting-element carriers 136, 137 may have respective cutter stations 196, 198 configured to support cutting elements 138, 140 in positions beyond the channel open ends 182, 184. The cutting-element carriers 136, 137 may be slidingly received in the cutter-body channels 174, 176 to accommodate replacement and to allow for adjustment of the positions of the cutter stations 188, 190 within channels 174, 176, and thereby the distance of the cutting elements 138, 140 from the axis of rotation 146.

The cutting-element carrier 137 has a first surface 200 on the end of the cutting-element carrier 137 opposite the open end 184 and facing toward the channel floor surface 186. The adjustment assembly 141 is specifically illustrated in FIGS. 3, 5, 6, 7, with FIG. 7 being an enlargement of the associated portion of FIG. 3. The adjustment assembly 141 includes the first surface 200 of the cutting-element carrier, an adjustment element in the form of a wedge 202 having a second surface 204 and a third surface 206, the channel floor surface 186, a resilient bias element 208 shown as a return spring 210, as well as the adjustment bore 188 and a drive element 212 in the form of an adjustment screw 214. The adjustment assembly 141 defines a position of the cutting-element carrier 192 in the channel 176 when the wedge second surface 204 is in contact with the cutting-element-carrier first surface 200.

The wedge 202 is movable along the adjustment line 190, which is transverse to the first surface 200, for adjusting the position of the cutting-element carrier 137 in the channel 176. The first and second surfaces 200, 204 may include a key and mating keyway, not shown, to guide the wedge as it moves relative to the cutting-element carrier 137. The second surface 204 may be at less than a 45-degree angle to the cutter line 152. One of the first surface 200 and second surface 204 extends continuously along an interface path 216 disposed transverse to the channel line 176. Interface path 216 represents an area of contact between the first surface 200 and the second surface 204 for a range of positions of the wedge 202, so the shape of the interface path 216 depends on the configuration of first and second surfaces 200, 204.

The third surface 206 moves along the floor surface 186, also referred to as a fourth surface, when the wedge 141 is moved along the adjustment line 190. The shape of adjustment line 190 is determined by the configuration of the third surface 206 and fourth surface 208.

In this example, the first and second surfaces 200, 204 are continuous planar surfaces that are in contact with each other. Similarly, the third and fourth surfaces 206 and 186 are continuous planar surfaces that are in contact with each other. These surfaces may have other configurations. For example the surfaces may be curved and the shape of the surfaces in each pair of surfaces may be different. As a further example, one of the pair of surfaces may be a convex surface or knob that contacts the other of the pair of surfaces. At least one of each pair of surfaces is preferably a continuous surface where the pair of surfaces are in contact. In this example, adjustment line 190 and surfaces 206 and 186 are transverse to the axis of rotation 146. As seen in FIGS. 3 and 7, the adjustment line 190 may also be transverse to the axis of rotation 28.

The drive element 212 is supported by the cutter body 135 and configured to be manipulated by a person for moving the adjustment-element wedge 202 along the adjustment line 190. The adjustment screw 214 is aligned with the wedge 202 and is threadedly received in the adjustment bore 188.

The return spring 210 is disposed proximate the floor surface 186 of channel 176 and is spaced from end of the cutting-element carrier 137. Return spring 210 may be in compression between a side of channel 176 and an end face of the wedge 202. In this example, the return spring 210 is configured to maintain the wedge 202 against the adjustment screw 214.

Figure 7:
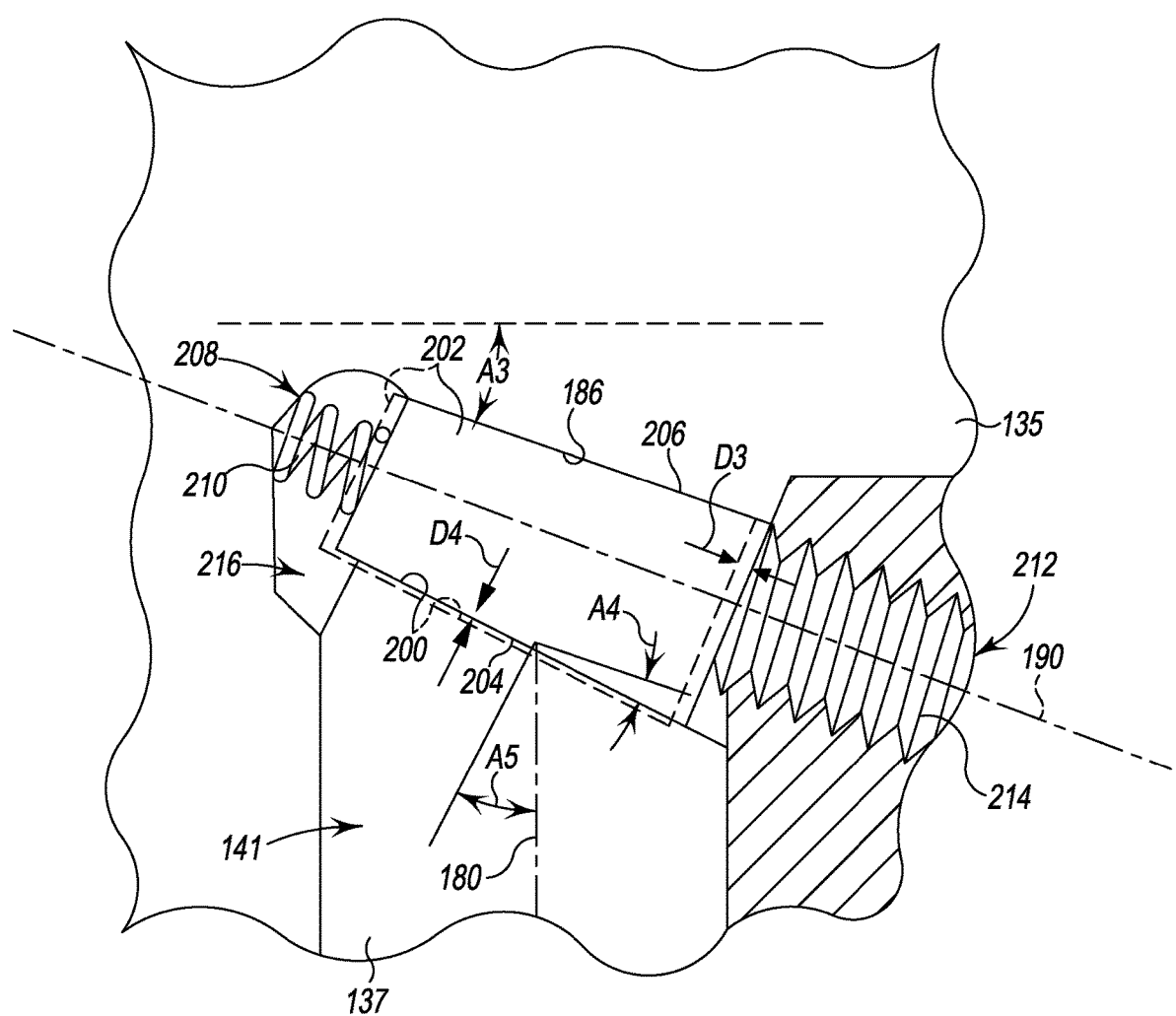
FIG. 7 is an enlargement of a portion of the cutter assembly shown in FIG. 3 illustrating adjustment of the tool holder.

Referring in particular to FIG. 7, the adjustment screw 214 and adjustment bore 188 have TPI threads per inch. The adjustment screw 214 may be configured to move the wedge 202 by rotation of the adjustment screw 214 in the adjustment bore 188 with the adjustment screw 214 in contact with the wedge 202. The adjustment screw 214, when rotated, moves the wedge 202 in a first direction along the adjustment line 190, which in this example is transverse to the channel line 180 and also transverse to the first surface 200 of the cutting-element carrier 137 directly facing the second surface 204 of the wedge 202.

N complete rotations of the adjustment screw 214 moves the wedge 202 a distance D3 equal to N/TPI. This in turn moves the cutting-element carrier 137 a distance $$D4 = \frac{\frac{N}{TPI}\tan b}{\cos a}$$

where the distance D4 is in a radial direction from the axis of rotation 146, a is an angle A3 of the adjustment line 190 to the axis of rotation 146, which in this example also corresponds to the angle of the third and fourth surfaces 206 and 186 to the axis of rotation 146, and b is an angle A4 of the first and second surfaces 200 and 204 to the adjustment line 190.

The angles may be any suitable angles appropriate for a particular application. In this example, the angle a is equal to 20-degrees, and the angle b is equal to 8-degrees. Each of angles A3 and A4 is preferably less than 45-degrees. As a result, the first and second surfaces 200, 204 are disposed at an angle A5 equal to angle A3 plus angle A4, or 28-degrees. Thus, a typical 32 TPI screw moves the wedge 202 a distance D3 equal to 0.031 inches per turn. The double inclined wedge allows the cutting-element carrier 137 to move a distance D4 equal to 0.0046 inches per turn due to the differential slopes of the second surface 204 of the wedge 202 and the angled fourth, channel-floor surface 186. A $1/16^{th}$ turn yields 0.0003 inches of movement of the cutting-element carrier, which is a comparatively fine adjustment.

The cutting-element carrier 137 may be moved during or after moving the wedge 202. In the example shown, movement of the wedge 202 further into channel 176 forces the cutting-element carrier 137 away from the axis of rotation 146, increasing the radius of a bore 143 that is bored by the boring assembly 130.

When the adjustment screw 214 is rotated in a reverse direction, the wedge 202 follows the movement of the adjustment screw 214 by action of the return spring 210 acting on the wedge 202. The cutting-element carrier 137 is then moved in the channel 176 until the first surface 200 is in contact with the second surface 204. When the key and keyway interface of the first and second surfaces 200, 204 has a dovetail configuration, the first and second surfaces are retained in contact regardless of the direction of movement of the wedge 202 relative to the cutting-element carrier 137.

The cutter assembly 132 further includes a lock assembly 218 configured to secure the cutting-element carrier 137 to the cutter body 135 in the channel 176 after adjusting the position of the cutting-element carrier 137 by manipulation of the wedge 202. The lock assembly 218 may include a threaded lock screw 220, a lock notch 222 and the threaded lock bore 192. Notch 222 is formed in a side of the cutting-element carrier 137 and includes a face angled toward the floor of the channel 176. This secures the cutting-element carrier 137 against the second surface 204 of the wedge 202.

In this example, the threaded lock bore 192 extends through a side of the cutter body 135 along the lock line 194 transverse to the axis of rotation 146 and transverse to the adjustment line 190. Although other configurations may be used, an example of which is embodied in the cutter assembly 20 shown in FIG. 1, the configuration of the lock assembly 218 and the adjustment assembly 141 at the same side of the cutter assembly 132 provides an advantageous single zone for adjustment and fixation of each of the cutting-elements 138 and 140.

Figure 9:
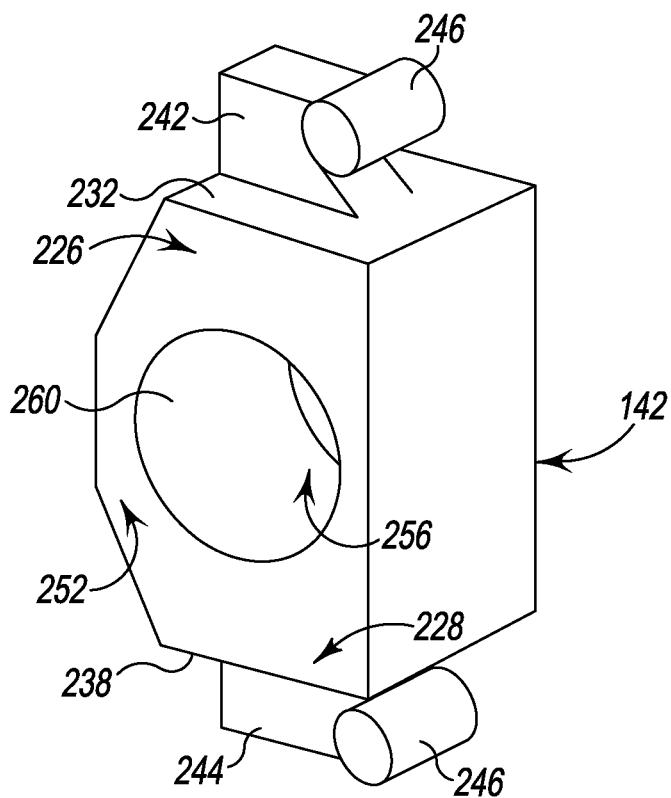
FIG. 9 is a schematic isometric view of a float-limiting insert included in the cutter assembly shown in FIG. 3.

An isometric view of the float-limiting insert 142 is shown in FIG. 9. The float-limiting insert 142 is configured to be fully received in recess 154 of the cutter body 135. The float-limiting insert 142 includes a first insert portion 226 disposed in first recess portion 156 and a second insert portion 228 disposed in second recess portion 158. In some examples, the first and second insert portions may be on separate float-limiting inserts, and they may be positioned at other locations on the cutter body 136, such as on the same side of the axis of rotation 146 or at axially opposite sides of the cutter body 136.

The insert disposed in the recess 154 has a length L3 that is less than a length L4 of the recess 154, as viewed in the plane of FIG. 3 corresponding to a plane parallel to a side face of the cutter body 135. As a result, with the float-limiting insert 142 positioned in an intermediate position in the recess 154, there is a first radial gap 230, having a width D5, between a first insert surface 232 of the insert 142 and a facing first cutter-body surface 234. Similarly, there is a second radial gap 236, having a width D6, between a second insert surface 238 of the insert 142 and a facing second cutter-body surface 240.

The float-limiting insert 142 is sized to be fully received in the recess 154, as is indicated by the position of the float-limiting insert 142 shown in FIG. 10. When fully received in the recess 154, the float-limiting insert 142 and associated portion of cutter body 136 define a cross-sectional configuration that is within the maximum cross-section configuration of the cutter body 136, thereby allowing the cutter assembly 132 to be inserted into the cutter slot 144 with the float-limiting insert 142 positioned in the recess 154.

The float-limiting insert 142 further includes a first retention tab 242 extending radially from the first insert portion 226 into slit 160. Similarly, a second retention tab 244 extends radially from the second insert portion 228 into slit 162. The first and second retention tabs 242, 244 are configured to allow retention screws 246 to be inserted into the first and second retention bores 170 and 172. The retention screws 246 allow the float-limiting insert 142 to move freely diametrically within the recess 154 between the first and second cutter-body surfaces 240 and 242. The retention screws 246 are also positioned to allow the float-limiting insert 142 to move freely along the axis of rotation 146 between the position in which the insert 142 is fully received in the recess 154, as shown in FIG. 10, and the position shown in FIG. 11 in which the insert 142 extends partially beyond the edge of the cutter body 136 and into a pocket 248 formed in the boring bar 134. In one example, the pocket 248 may extend 0.005 inches into the boring bar 134. When the cutter assembly 132 is not disposed in the cutter slot 144 of the boring bar 134, the retention screws 246 prevent the insert 142 from being removed from the recess 154.

The cutter assembly includes a self-aligning assembly 250 that will be more fully described with reference to FIGS. 13 and 14. This includes the V-shaped recess alignment element 155 of the recess 154. Additionally, the float-limiting insert 142 includes a mating V-shaped insert alignment element 252. In this example, the recess alignment element 155 is an extension of the recess 154 away from the insert 142. Correspondingly, the insert alignment element 252 is a projection of the insert toward the recess alignment element 155. The alignment elements 155, 252 are configured to mate one with the other. In this example, when the insert 142 is positioned fully within the recess 154, the insert alignment element 252 extends into and seats against the surfaces of the cutter body 135 forming the recess alignment element 155. This position is shown in FIG. 10. It will be appreciated that other configurations of the alignment elements 155, 252 may be used.

Figure 12:
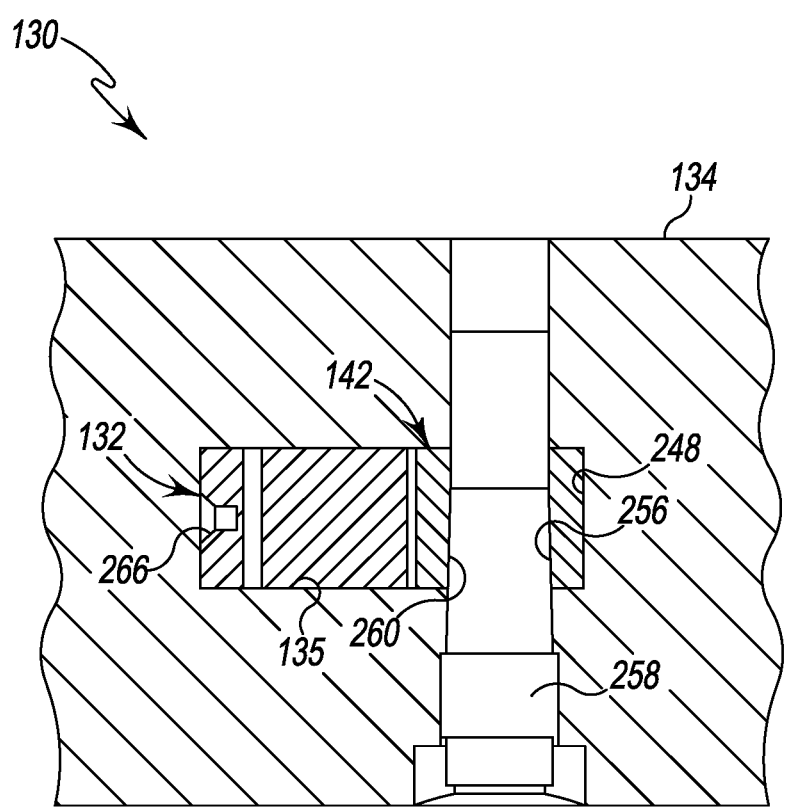
FIG. 12 is a schematic cross-sectional view of an example of a portion of the production boring bar assembly of FIG. 3 showing the cutter assembly secured to the boring bar.

The cutter assembly 132 also includes a securing assembly 254 for securing the float-limiting insert 142 to the boring bar 134 as shown in FIG. 11, as well as FIG. 12, which is a schematic cross-sectional view of the cutter assembly 132 secured to the boring bar 134. The securing assembly 254 may include a tapered bore 256 and a fastener in the form of a tapered screw 258. In the embodiment shown in FIG. 3, the securing assembly 254 is located along the axis of rotation 146 of the cutter body 135. A notch 260 is formed in tapered bore 256 appropriately configured to force the tapered screw 258 to index on two edges of the tapered bore 256 and secure the float-limiting insert 142 into a corner 262 of the pocket 248, thereby securing the float-limiting insert 142 to the boring bar 134 and aligning the float-limiting insert with the axis of rotation 146.

With the float-limiting insert 142 secured to the boring bar 134, the cutter body 135 is allowed to float diametrically within the recess 154 within the limits defined by the first insert surface 232 and the second insert surface 238. The cutter body 135 can float a total distance equal to the sum of the distances D5 and D6 of the first and second radial gaps 230 and 236. In one example, the total diametrical float is in the range of 0.003 inches to 0.005 inches. Cutting elements 138, 140 thus float, as represented by double-ended arrow 264, a total distance equal to the sum of distances D5 and D6.

As mentioned previously, cutting elements 138 and 140 may create a production bore 143 depicted in FIG. 4, relative to the axis of rotation 148 of the boring bar 134. In this example, the cutter assembly 132 has dual cutter elements 138, 140 that are both adjusted using adjustment assemblies, such as adjustment assembly 141 associated with cutting element 140. The accuracy of boring using boring assembly 130 is expected to be about 0.0005 inches on the diameter or better, resulting in a very accurate final machined product.

The cutter body 135 further includes a centering notch 266 centered on an axially facing side of the cutter body 135 centered on the axis of rotation 146 axially opposite from the recess 154. This centering notch 266 is used during adjustment of the cutting elements 138, 140 of the cutter assembly 132 as discussed below.

Figure 13:
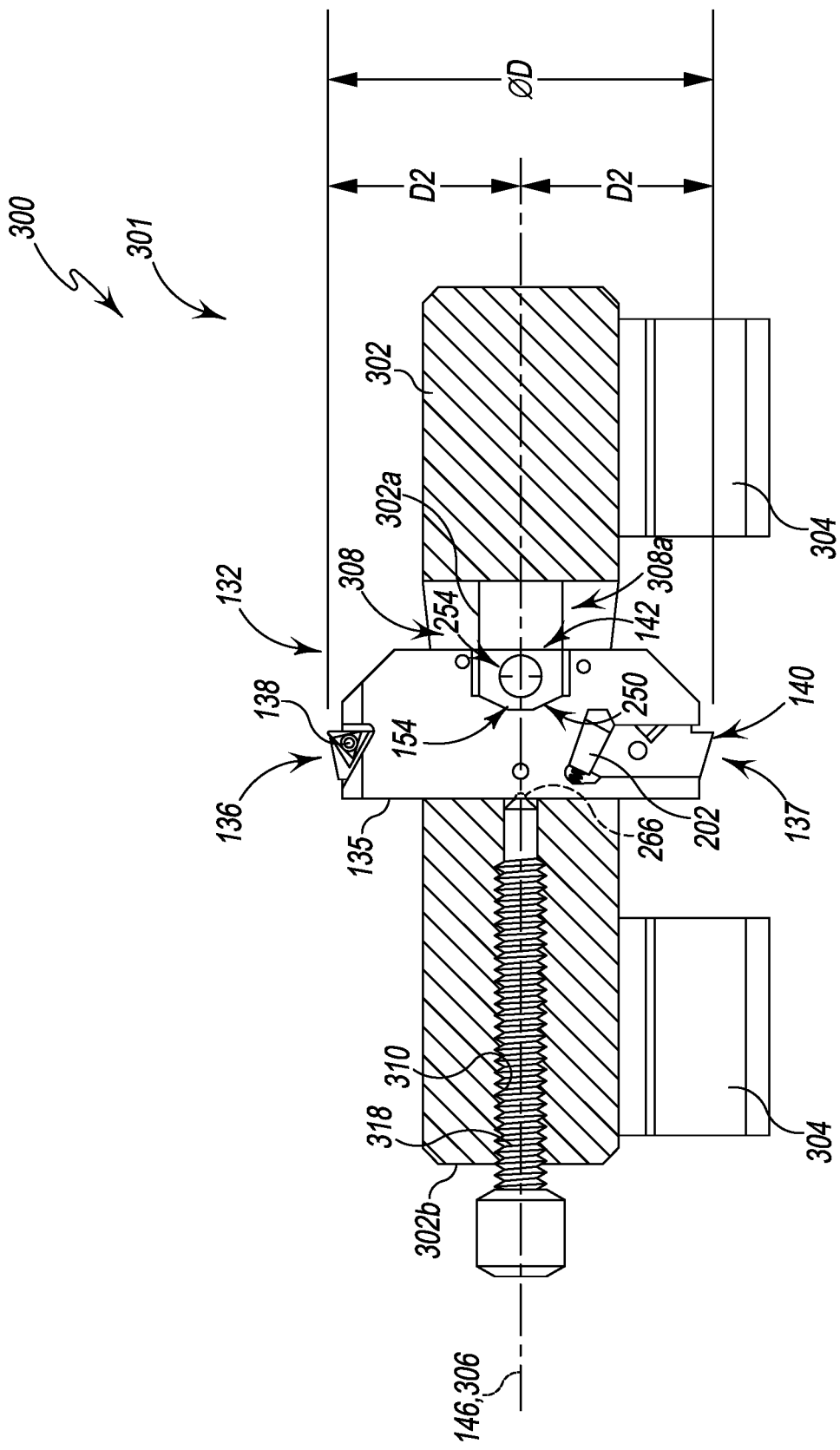
FIG. 13 is a schematic cross-sectional view of a boring assembly including an illustrative set-up bar.
Figure 14:
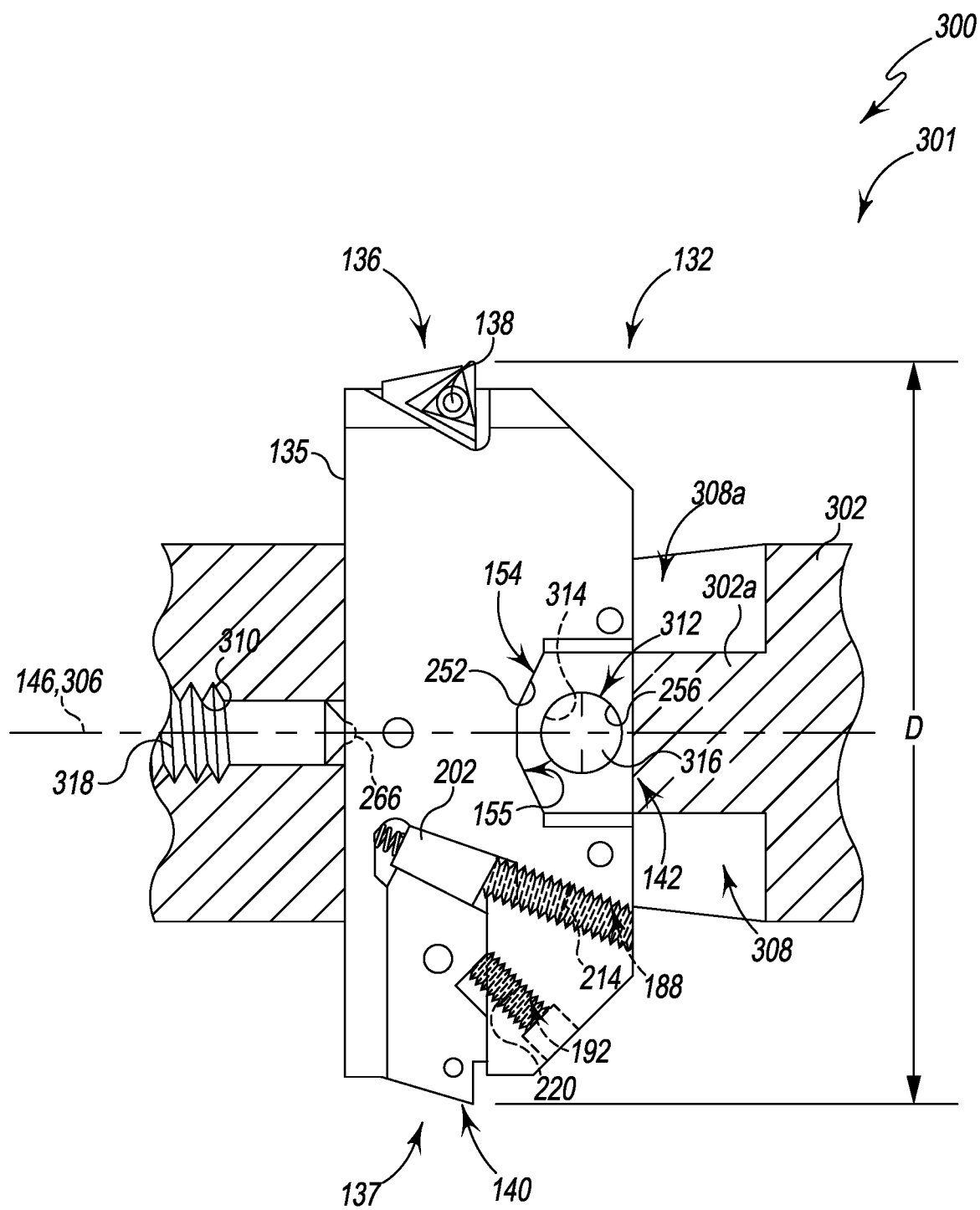
FIG. 14 is an enlargement of a portion of the boring assembly shown in FIG. 13 illustrating securing the cutter assembly to the set-up bar.

FIG. 13 is a schematic cross-sectional view of a boring set-up assembly 300 including an illustrative boring set-up bar 302 for adjusting the positions of cutting elements 138, 140 of the cutter assembly 132 depicted in FIGS. 3-12. FIG. 14 is an enlargement of the center portion of set-up assembly 300 showing details of the structure of the set-up bar 302 relative to the cutter assembly 132.

The set-up bar 302 is supported on conventional spaced-apart V-blocks 304. The set-up assembly 300 accordingly also includes the cutter assembly 132. The set-up bar 302 has an axis of rotation 306 corresponding to axis of rotation 146, and includes a cutter slot 308 configured to facilitate adjustment of the cutting elements 138, 140 on the cutter body 135. The cutter slot is axially longer than the cutter assembly 132 having a slot section 308a that is open except for a protrusion portion 302a of the set-up bar 302. The protrusion portion 302a is sized and positioned to contact only the insert 142 of the cutter assembly 132 when the cutter assembly 132 is axially centered in the cutter slot 308.

The set-up bar 302 further includes an axially extending threaded taper bore 310 extending from an end 302b of the set-up bar opposite from the protrusion portion 302a. The tapered bore 310 is centered on the axis of rotation 306 and terminates at an opening in the cutter slot 308.

The set-up assembly 300 further includes a securing assembly 312 for securing the float-limiting insert 142 to the set-up bar 302. Similar to the securing assembly 254 of the boring assembly 130, the securing assembly 312 may include a tapered bore 314 that extends into the set-up bar 302 and is configured to be complementary with the tapered bore 256 of the float-limiting insert 142. The cutter assembly 132 is inserted into the cutter slot 308 with the insert 142 aligned with the protrusion portion 302a of the set-up bar 302. A fastener in the form of a tapered screw 316 is then threaded into the tapered bores 314 and 256 to seat the insert 142 against a side corner of the slot 308 formed by the end of the protrusion portion 302a. This fixes the insert 142 to the set-up bar and aligns it with the axis of rotation 306.

With the cutter assembly 132 held by the insert 142 in a generally centered position in the cutter slot 308, a centering fastener in the form of a tapered screw 318 is screwed into the tapered bore 310 until a tip of the tapered screw 318 seats into the centering notch 266 in the cutter body 135. The tapered screw 318 is then tightened further, forcing the cutter body 135 against the now fixed insert 142. This seats the alignment element 155 on the cutter body 135 with the insert alignment element 252. As was described with reference to the boring assembly 130 in FIGS. 3-12, this mating of the respective alignment elements 155, 252 aligns the cutter body 135 and the cutter assembly 132 as a whole with the axis of rotation 306 of the set-up bar 302.

As has been described, the cutting-element carriers 136, 137 extend along the cutter body 135 distally from the axis of rotation 146. The diametrical distance D between the cutting elements 138, 140 of the cutting-element carriers 136, 137 corresponds with the diameter of the production bore 143 described with reference to FIG. 4.

With the cutter assembly 132 secured in the cutter slot 308 to the set-up bar 302, the distance D between the cutting elements 138, 140 is changed by adjusting the positions of the cutter-elements 138, 140 individually. This is performed by adjusting the positions of the wedges 202 as described for the cutter assembly 132 by appropriate turning of the adjustment screws 214. In the example depicted in FIGS. 13 and 14, the distance D is adjusted by adjusting the distance D/2 that each of the cutting elements 138, 140 is from the axis of rotation of 306. In this example, an asymmetry between the radial distances of the two cutting elements 138, 140 of 0.015 inches may be considered acceptable, so long as the total distance D is within 0.0005 inches of a desired value.

In this example, the adjustment bore 188 is disposed transversely to the axis of rotation 146, allowing a user to access the adjustment screw 214 and wedge 202 through the open cutter slot section 308a while the cutter assembly 132 is fixed to the set-up bar 302. Similarly, the lock screw 220 in the lock bore 192 is accessible from the same side of the cutter body 135 as the adjustment screw 214.

Example 4

This section describes additional aspects and features of embodiments presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A cutter assembly comprising:
a cutter body configured to be mounted in a cutter slot of a boring bar and having an axis of rotation corresponding to an axis of rotation of the boring bar, the cutter body including a channel extending along a first line transverse to the axis of rotation, the channel having an open end disposed distally of the axis of rotation and a length extending away from the open end;

a cutter-element carrier configured to support a cutter element at a cutter-element station, the cutter-element carrier being slidingly received in the cutter-body channel and configured to be movable in the channel along the first line with the cutter-element station disposed to support the cutter element in a position beyond the channel open end, the cutter-element carrier having a first surface transverse to the first line; and an adjustment element having a second surface defining a position of the cutter-element carrier in the channel when the second surface is in contact with the first surface, the adjustment element being movable along a second line transverse to the first surface for adjusting the position of the cutter-element carrier in the channel, the second surface being at less than a 45-degree angle to the first surface.

A2. The cutter assembly of paragraph A1, further comprising a drive element supported by the cutter body and configured to be manipulable by a person for moving the adjustment element along the second line.

A3. The cutter assembly of paragraph A1, wherein the adjustment element includes a third surface, and the cutter body includes a fourth surface in contact with the third surface, the third surface moving along the fourth surface when the adjustment element is moved along the second line, the third and fourth surfaces being configured to define the second line.

A4. The cutter assembly of paragraph A3, wherein the fourth surface is a channel floor disposed opposite the open end.

A5. The cutter assembly of paragraph A3, wherein at least one of the first, second, third, and fourth surfaces is a planar surface.

A6. The cutter assembly of paragraph A5, wherein the first and second surfaces or the third and fourth surfaces are planar and parallel.

A7. The cutter assembly of paragraph A5, wherein the first and second surfaces and the third and fourth surfaces are planar and parallel, respectively.

A8. The cutter assembly of paragraph A7, wherein the adjustment element is a wedge and the second and third surfaces extend in respective transverse planes with the third surface extending parallel to the second line.

A9. The cutter assembly of paragraph A8, wherein the cutter body includes an adjustment threaded bore aligned with the adjustment element, the cutter assembly further comprising an adjustment screw having TPI threads per inch received in the threaded bore, the threaded bore and adjustment screw configured to move the adjustment element by rotation of the adjustment screw in the threaded bore with the adjustment screw in contact with the wedge, one complete rotation of the adjustment screw moving the cutter-element carrier an adjustment amount $$A = \frac{\frac{1}{TPI}\tan b}{\cos a}$$

where a is an angle of the third surface to the axis of rotation and b is an angle of the second surface to the third surface.

A10. The cutter assembly of paragraph A9, wherein a+b<45 degrees.

A11. The cutter assembly of paragraph A1, further comprising a resilient element supported by the cutter body or the cutter-element carrier for resiliently urging the adjustment element along the second line.

A12. A cutter assembly comprising:

a cutter body configured to be mounted in a cutter slot of a boring bar and having an axis of rotation corresponding to an axis of rotation of the boring bar, the cutter body including a channel extending along a first line normal to the axis of rotation, the channel having an open end disposed distally of the axis of rotation and a floor defining a planar first surface opposite the open end, the cutter body including a threaded adjustment bore;

a cutter-element carrier configured to support a cutter element at a cutter-element station, the cutter-element carrier being slidingly received in the cutter-body channel and configured to be movable in the channel along the first line with the cutter-element station disposed to support the cutter element in a position beyond the channel open end, the cutter-element carrier having a planar second surface transverse to the first line;

an adjustment wedge disposed in the channel between the first and second surfaces and aligned with the threaded adjustment bore, the adjustment wedge having a planar third surface parallel to and in flush contact with the second surface and a planar fourth surface parallel to and in flush contact with the first surface, the adjustment wedge being movable along a second line transverse to the third surface and parallel to the fourth surface for adjusting the position of the cutter-element carrier in the channel, the third surface being at less than a 45-degree angle to the axis of rotation; and an adjustment screw having TPI threads per inch received in the adjustment bore, the threaded bore and adjustment screw configured to move the adjustment wedge by rotation of the adjustment screw in the adjustment bore with the adjustment screw in contact with the wedge, one complete rotation of the adjustment screw moving the cutter-element carrier an adjustment amount $$A = \frac{\frac{1}{TPI}\tan b}{\cos a}$$

where a is an angle of the third surface to the axis of rotation, b is an angle of the second surface to the third surface, and a+b<45 degrees.

A13. A method comprising:

supporting a cutter-element carrier in a channel of a cutter body, the channel extending in a channel line transverse to an axis of rotation of the cutter body during boring;

moving a first surface of an adjustment element a first distance in a first direction transverse to the channel line and transverse to a second surface of the cutter-element carrier directly facing the first surface, where one of the first and second surfaces extend continuously in an interface line disposed transverse to the first direction and transverse to the channel line; and during or after moving the first surface of the adjustment element, moving the cutter-element carrier a second distance in the channel along the channel line so that the first surface is in contact with the second surface.

A14. The method of paragraph B13, wherein moving the cutter-element carrier a second distance includes moving the cutter-element carrier a second distance that is less than the first distance.

A15. The method of paragraph B13, wherein moving the cutter-element carrier a second distance includes moving the cutter-element carrier a second distance that is less than half the first distance.

A16. The method of paragraph B13, wherein moving the first surface of the adjustment element in a first direction includes moving the first surface of the adjustment element in a first direction that is transverse to the axis of rotation.

A17. The method of paragraph B13, wherein moving the first surface of the adjustment element includes moving the first surface of the adjustment element in the form of a wedge in the first direction, the wedge having the first surface on one planar face and a third surface parallel to the first direction on another planar face opposite the one face.

A18. The method of paragraph B17, wherein moving the wedge includes moving the third surface against a planar fourth surface of the cutter body while moving the first surface in a first direction.

A19. The method of paragraph B18, wherein moving the wedge includes moving the first surface along the second surface, where the first and second surfaces are parallel planar surfaces.

A20. The method of paragraph B13, further comprising, after moving the cutter-element carrier in the channel, securing the cutter-element carrier to the cutter body, inserting the cutter body in a cutter slot of a boring bar, securing the cutter body to the boring bar, and boring a bore in a workpiece with the boring bar supporting the cutter body.

B1. A cutter assembly comprising:
  a cutter body configured to be mounted in a cutter slot of a boring bar and having an axis of rotation corresponding to an axis of rotation of the boring bar, the cutter slot extending along a slot line transverse to the axis of rotation, the cutter body, when mounted in the cutter slot, being movable in the cutter slot along the slot line, the cutter body including at least a first recess portion defining a first cutter surface facing a first direction along the cutter line and a second recess portion defining a second cutter surface facing a second direction opposite to the first direction along the cutter line, the first and second recess portions each having a respective opening portion facing transverse to the cutter line; and
  first and second insert portions configured to be inserted through the respective openings into the first and second recess portions, respectively, the first insert portion defining a first travel-limit surface that faces the first cutter surface and the second insert portion defining a second travel-limit surface that faces the second cutter surface.

B2. The cutter assembly of paragraph B1, wherein the first and second insert portions are configured to be fixed by at least a first fastener relative to the boring bar with the cutter body mounted in the cutter slot and with the first and second insert portions received in the first and second recess portions, the cutter body being freely movable in the cutter slot along the slot line between a first position in which the first cutter surface is in contact with the first travel-limit surface and a second position different than the first position in which the second cutter surface is in contact with the second travel-limit surface.

B3. The cutter assembly of paragraph B2, wherein the cutter body has a maximum cross-sectional configuration orthogonal to the cutter line, and the insert portions are within the maximum cross-sectional configuration when the insert portions are fully received in the recess portions.

B4. The cutter assembly of paragraph B3, where the boring bar includes a pocket opening to the slot aligned with the insert when the cutter body is positioned in the slot with the axis of rotation of the cutter body aligned with the axis of rotation of the boring bar, the insert being configured to be fixed by at least a first fastener to the boring bar with the insert seated in the pocket and the cutter body floating in the slot.

B5. The cutter assembly of paragraph B1, wherein the cutter body includes a recess and an insert, the recess including the first and second recess portions, the recess having a recess opening including the respective opening portions, and the insert including the first and second insert portions.

B6. The cutter assembly of paragraph B5, wherein the cutter body includes a first alignment element defining a portion of the recess, and the insert includes a second alignment element, the second alignment element mating with the first alignment element when the insert is inserted in the recess and seated against the cutter body.

B7. The cutter assembly of paragraph B6, wherein the first alignment element is disposed at a position on the cutter body at a position having a predetermined relationship to the axis of rotation of the cutter body, and mating the first alignment element with the second alignment element positions the cutter body in a predetermined position relative to the insert.

B8. The cutter assembly of paragraph B7, wherein the first alignment element is symmetrically configured about the axis of rotation of the cutter body, and the second alignment element, when in mated relationship with the first alignment element is also symmetrically configured about the axis of rotation of the cutter body.

B9. The cutter assembly of paragraph B7, wherein the insert is configured to be fixed by at least a first fastener relative to a set-up bar with the cutter body mounted in the cutter slot and with the second alignment element in mated relationship with the first alignment element, the cutter body having a cutter station configured to support a cutter element distal of the axis of rotation, and the position of the cutter station being adjustable relative to the axis of rotation.

B10. The cutter assembly of paragraph B9, wherein when the insert is fixed relative to the set-up bar, the insert has a position in the set-up bar having a predetermined relationship to the axis of rotation of the boring bar.

B11. The cutter assembly of paragraph B10, wherein the first alignment element is symmetrically configured about the axis of rotation of the cutter body, the second alignment element being symmetrically configured to align the cutter body with the axis of rotation of the set-up bar when the insert is fixed relative to the set-up bar.

B12. A method comprising:
  inserting a cutter body into a cutter slot of a boring bar, the cutter slot extending along a slot line transverse to the axis of rotation, the cutter body, when mounted in the cutter slot, being movable in the cutter slot along the slot line;
  inserting a first insert portion into a first recess portion of the cutter body, the first recess portion defining a first cutter surface facing a first direction along the cutter line, the first insert portion defining a first travel-limit surface that faces the first cutter surface; and
  inserting a second insert portion into a second recess portion of the cutter body, the second recess portion defining a second cutter surface facing a second direction opposite to the first direction along the cutter line, the first and second recess portions each having a respective opening portion facing transverse to the cutter line, the second insert portion defining a second travel-limit surface that faces the second cutter surface;
  securing the first and second insert portions to the boring bar; and boring a bore in a workpiece with the cutter body floating between the first and second travel-limit surfaces.

B13. The method of paragraph B12, wherein securing the first and second insert portions to the boring bar include fixing the first and second insert portions to the boring bar with at least a first fastener.

B14. The method of paragraph B12, wherein inserting a first portion into a first recess portion and inserting a second insert portion into a second recess portion includes inserting an insert including the first and second insert portions into a recess including the first and second recess portions.

B15. The method of paragraph B14, further comprising positioning the cutter body in a predetermined position relative to the insert by mating a first alignment element defining a portion of the recess with a second alignment element of the insert.

B16. The method of paragraph B15, wherein positioning the cutter body in a predetermined position relative to the insert includes positioning the cutter body in a predetermined position relative to the boring bar when the insert is secured relative to the boring bar.

B17. The method of paragraph B15, wherein mating the first alignment element with a second alignment element includes aligning the axis of rotation of the cutter body with the axis of rotation of the set-up bar.

B18. The method of paragraph B14, further comprising inserting the cutter body into a cutter slot of a set-up bar, fixing the insert to a set-up bar with the second alignment element in mated relationship with the first alignment element, the cutter body having a cutter station configured to support a cutter element distal of the axis of rotation, the method further comprising adjusting the position of the cutter station relative to the axis of rotation of the cutter body while the first alignment element is mated with the second alignment element.

B19. The method of paragraph B14, wherein inserting a cutter body into the cutter slot of the boring bar includes inserting a cutter body into the cutter slot of the boring bar with the insert is positioned in the recess.

B20. The method of paragraph B14, wherein securing the first and second insert portions to the boring bar includes aligning the insert with a pocket in the boring bar opening to the slot when the cutter body is positioned in the slot with the axis of rotation of the cutter body aligned with the axis of rotation of the boring bar, inserting a portion of the insert into the pocket, and securing the insert into the boring bar while the portion of the insert is seated in the boring bar and the cutter body is floating in the slot.

Advantages, Features, Benefits

The different embodiments described herein provide several advantages over known solutions for boring a bore in a workpiece. For example, the illustrative embodiments described herein allow for comparatively precise adjustment of a cutting element of a cutter assembly. Additionally, and among other benefits, illustrative embodiments described herein allow floating of a dual-point cutter assembly within a predefined range of float during boring. However, not all embodiments described herein provide the same advantages or the same degree of advantage.

More specifically, by incorporating the use of a taper screw to secure the float-limiting insert, float is objectively determined based on the relative dimensions of the insert and the cutter-body recess, removing the need for a subjective determination by a person setting up a boring assembly. Additionally, the cutter assembly does not require the boring bar and cutter assembly to be set together in a tool grind shop. Only a simple, dedicated set up fixture is required to micro adjust each cutting element each time a cutting insert is replaced. Also, the disclosed cutter assembly has the adjustment and lock screws accessible from one side of the set up fixture. This greatly simplifies the adjustment and fixing of the final cutter-element position since the cutter assembly does not have to be rotated about centerline.

Another feature that enhances the fine adjustment of the cutter assembly is the double inclined wedge. A typical screw adjustment allows the tool holder to move as a direct function of thread pitch. Thus, a 32 TPI (Threads Per Inch) screw will move a cutter 0.031 inches per turn which is very coarse even with partial turns. The disclosed double inclined wedge allows the cutting-element carrier to move at 0.0046 inches per turn due to the differential slopes of the wedge and channel floor. A $\frac{1}{16}^{th}$ turn yields only 0.0003 inches of movement, which allows for very fine adjustment. The cutting-element carrier is fixed into place after adjustment by a set screw. This set screw bears against a notch that has a very slight side angle that forces the cutting-element carrier against the floor of the channel. This prevents the rotating lock screw from pulling or lifting the cutting-element carrier off of the floor of the channel, which would cause a loss of accuracy during use.

Additionally, the float assembly allows the cutter to float without requiring the operator to loosen, or back off the lock screw. The float-limiting insert accepts a taper screw and is uncoupled from the cutter body. When installed in the boring bar, the cutter assembly floats without the need to back off the taper screw. As mentioned, the anticipated accuracy of the boring assembly 130 is 0.0005 inch on the diameter or better, thereby producing a very accurate final machined product.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:
1. A method comprising:
supporting a cutter-element carrier in a channel of a cutter body, the channel extending in a channel line transverse to an axis of rotation of the cutter body during boring;
moving a first surface of an adjustment element a first distance in a first direction transverse to the channel line and transverse to a second surface of the cutter-element carrier directly facing the first surface, where one of the first and second surfaces extends continu- ously in an interface line disposed transverse to the first direction and transverse to the channel line;

during or after moving the first surface of the adjustment element, moving the cutter-element carrier a second distance in the channel along the channel line so that the first surface is in contact with the second surface;

wherein the moving step includes rotating an adjustment screw in a thread bore extending from a first side of the channel, the adjustment screw impinging on a first end face of the adjustment element causing movement of the adjustment element in the first direction, and spring biasing a second end face of the adjustment element opposite from the first end face, in a direction opposite from the first direction.

2. The method of claim 1, wherein moving the cutter-element carrier a second distance includes moving the cutter-element carrier a second distance that is less than the first distance.

3. The method of claim 2, wherein moving the cutter-element carrier a second distance includes moving the cutter-element carrier a second distance that is less than half the first distance.

4. The method of claim 2, further comprising, after moving the cutter-element carrier in the channel, securing the cutter-element carrier to the cutter body, inserting the cutter body in a cutter slot of a boring bar, securing the cutter body to the boring bar, and boring a bore in a workpiece with the boring bar supporting the cutter body.

5. The method of claim 1, wherein moving the cutter-element carrier a second distance includes moving the cutter-element carrier a second distance that is less than half the first distance.

6. The method of claim 5, further comprising, after moving the cutter-element carrier in the channel, securing the cutter-element carrier to the cutter body, inserting the cutter body in a cutter slot of a boring bar, securing the cutter body to the boring bar, and boring a bore in a workpiece with the boring bar supporting the cutter body.

7. The method of claim 1, wherein moving the first surface of the adjustment element in a first direction includes moving the first surface of the adjustment element in a first direction that is transverse to the axis of rotation.

8. The method of claim 7, wherein moving the first surface of the adjustment element includes moving the first surface of the adjustment element in the form of a wedge in the first direction, the wedge having the first surface on one planar face and a third surface parallel to the first direction on another planar face opposite the one face.

9. The method of claim 1, wherein moving the first surface of the adjustment element includes moving the first surface of the adjustment element in the form of a wedge in the first direction, the wedge having the first surface on one planar face and a third surface parallel to the first direction on another planar face opposite the one face.

10. The method of claim 9, wherein moving the wedge includes moving the third surface against a planar fourth surface of the cutter body while moving the first surface in the first direction.

11. The method of claim 10, wherein moving the wedge includes moving the first surface along the second surface, where the first and second surfaces are parallel planar surfaces.

12. The method of claim 1, further comprising, after moving the cutter-element carrier in the channel, securing the cutter-element carrier to the cutter body, inserting the cutter body in a cutter slot of a boring bar, securing the cutter body to the boring bar, and boring a bore in a workpiece with the boring bar supporting the cutter body.

13. A cutter assembly comprising:

a cutter body configured to be mounted in a cutter slot of a boring bar and having an axis of rotation corresponding to an axis of rotation of the boring bar, the cutter slot extending along a slot line transverse to the axis of rotation of the cutter body, the cutter body, when mounted in the cutter slot, being movable in the cutter slot along the slot line, the cutter body including at least a first recess portion defining a first cutter surface facing a first direction along the cutter line and a second recess portion defining a second cutter surface facing a second direction opposite to the first direction along the cutter line, the first and second recess portions each having a respective opening portion facing transverse to the cutter line; and first and second insert portions configured to be inserted through the respective openings into the first and second recess portions, respectively, the first insert portion defining a first travel-limit surface that faces the first cutter surface and the second insert portion defining a second travel-limit surface that faces the second cutter surface;

wherein the cutter body includes a recess and an insert, the recess including the first and second recess portions, the recess having a recess opening including the respective opening portions, and the insert including the first and second insert portions; and wherein the cutter body includes a first alignment element defining a portion of the recess, and the insert includes a second alignment element, the second alignment element mating with the first alignment element when the insert is inserted in the recess and seated against the cutter body.

14. The cutter assembly of claim 13, wherein the first and second insert portions are configured to be fixed by at least a first fastener relative to the boring bar with the cutter body mounted in the cutter slot and with the first and second insert portions received in the first and second recess portions, the cutter body being freely movable in the cutter slot along the slot line between a first position in which the first cutter surface is in contact with the first travel-limit surface and a second position different than the first position in which the second cutter surface is in contact with the second travel-limit surface.

15. The cutter assembly of claim 14, wherein the cutter body has a maximum cross-sectional configuration orthogonal to the cutter line, and the insert portions are within the maximum cross-sectional configuration when the insert portions are fully received in the recess portions.

16. The cutter assembly of claim 15 where the boring bar includes a pocket opening to the slot aligned with the insert when the cutter body is positioned in the slot with the axis of rotation of the cutter body aligned with the axis of rotation of the boring bar, the insert being configured to be fixed by at least a first fastener to the boring bar with the insert seated in the pocket and the cutter body floating in the slot.

17. The cutter assembly of claim 13, wherein the first alignment element is disposed at a position on the cutter body at a position having a predetermined relationship to the axis of rotation of the cutter body and mating the first alignment element with the second alignment element positions the cutter body in a predetermined position relative to the insert.

18. The cutter assembly of claim 17, wherein the first alignment element is symmetrically configured about the axis of rotation of the cutter body, and the second alignment element, when in mated relationship with the first alignment element is also symmetrically configured about the axis of rotation of the cutter body.

19. A method comprising:
   inserting a cutter body into a cutter slot of a boring bar, the cutter slot extending along a slot line transverse to an axis of rotation of the cutter body, wherein the cutter body, when mounted in the cutter slot, is movable in the cutter slot along the slot line;
   inserting a first insert portion into a first recess portion of the cutter body, the first recess portion defining a first cutter surface facing a first direction along the cutter line, the first insert portion defining a first travel-limit surface that faces the first cutter surface; and
   inserting a second insert portion into a second recess portion of the cutter body, the second recess portion defining a second cutter surface facing a second direction opposite to the first direction along the cutter line, the first and second recess portions each having a respective opening portion facing transverse to the cutter line, the second insert portion defining a second travel-limit surface that faces the second cutter surface;
   securing the first and second insert portions to the boring bar; and
   boring a bore in a workpiece with the cutter body floating between the first and second travel-limit surfaces;
   wherein inserting the first insert portion into the first recess portion and inserting the second insert portion into the second recess portion includes inserting an insert including the first and second insert portions into a recess including the first and second recess portions; and
   further comprising positioning the cutter body in a predetermined position relative to the insert by mating a first alignment element defining a portion of the recess with a second alignment element of the insert.

20. The method of claim 19, wherein securing the first and second insert portions to the boring bar includes fixing the first and second insert portions to the boring bar with at least a first fastener.

* * * * *